US011198247B2

(12) United States Patent
Wang et al.

(10) Patent No.: US 11,198,247 B2
(45) Date of Patent: Dec. 14, 2021

(54) SYSTEM AND METHOD FOR THREE-DIMENSIONAL FABRICATION

(71) Applicant: National Taipei University of Technology, Taipei (TW)

(72) Inventors: Jia Chang Wang, Taipei (TW); Tseng Pu Yang, Singapore (SG); Hitesh Dommati, Hanamkonda (IN)

(73) Assignee: National Taipei University of Technology, Taipei (TW)

( * ) Notice: Subject to any disclaimer, the term of this patent is extended or adjusted under 35 U.S.C. 154(b) by 181 days.

(21) Appl. No.: 16/507,015

(22) Filed: Jul. 9, 2019

(65) Prior Publication Data

US 2021/0008792 A1    Jan. 14, 2021

(51) Int. Cl.
| | |
|---|---|
| *B29C 64/10* | (2017.01) |
| *B29C 64/129* | (2017.01) |
| *B29C 64/255* | (2017.01) |
| *B29C 64/245* | (2017.01) |
| *B29C 64/277* | (2017.01) |
| *B29C 64/314* | (2017.01) |
| *B29C 64/295* | (2017.01) |
| *B33Y 40/00* | (2020.01) |
| *B33Y 10/00* | (2015.01) |
| *B33Y 30/00* | (2015.01) |

(52) U.S. Cl.
CPC .......... *B29C 64/129* (2017.08); *B29C 64/245* (2017.08); *B29C 64/255* (2017.08); *B29C 64/277* (2017.08); *B29C 64/295* (2017.08); *B29C 64/314* (2017.08); *B33Y 10/00* (2014.12); *B33Y 30/00* (2014.12); *B33Y 40/00* (2014.12)

(58) Field of Classification Search
CPC ... B29C 64/307; B29C 64/357; B29C 64/129; B29C 64/124; B29C 64/135; B29C 64/314; B29C 64/245; B29C 64/255; B29C 64/295; B29C 64/277
See application file for complete search history.

(56) References Cited

U.S. PATENT DOCUMENTS

| | | | |
|---|---|---|---|
| 2018/0200948 A1* | 7/2018 | Kuijpers | B29C 64/245 |
| 2019/0039300 A1* | 2/2019 | Mckinnell | B29C 64/393 |
| 2019/0152149 A1* | 5/2019 | Arayama | B29C 33/40 |
| 2020/0147881 A1* | 5/2020 | Medalsy | B29C 64/245 |

* cited by examiner

*Primary Examiner* — Joseph S Del Sole
*Assistant Examiner* — Jamel M Nelson

(57) ABSTRACT

An additive manufacturing (AM) system and method configured to fabricate a 3D printed object from a composition is provided. The AM system comprises a vat assembly having a vat, a pump, and a density control reservoir and an AM assembly having a blade system and a build system. The pump system pumps the composition from the vat, having a first and second fluid outlet and at least one perforated outlet extension attached thereto, to the density control reservoir and then back into the vat through an inlet conduit. The at least one perforated outlet extension has a tube attachment mechanism and at least one elongated perforated tube assembly communicating therewith. The blade system has a dispersing blade and cutting blade, dispersing the composition from the inlet conduit toward and throughout a central top level of the composition and cutting a top surface of the composition, respectively.

11 Claims, 24 Drawing Sheets

SYSTEM AND METHOD FOR THREE-DIMENSIONAL FABRICATION

TECHNICAL FIELD

Example embodiments relate generally to the field of additive manufacturing (AM) and, more particularly, to a system and method for three-dimensional (3D) fabrication of a composition.

BACKGROUND

Additive manufacturing (AM) or three-dimensional (3D) printing translates computer-aided design (CAD) virtual 3D models into physical and functionally complex structured objects. By digital slicing of CAD, 3D scan, or tomography data, AM fabricates objects by successively stacking cross-sections layer-by-layer.

Among the AM processes for liquid photocurable compositions, VAT photopolymerization is a process whereby a cross-section of a liquid photocurable composition in a vat is selectively cured or hardened by light-activated polymerization. Generally, a final object is fabricated in a layer-by-layer fashion as an elevatable assembly moves through the liquid photocurable composition along a z-axis.

For 3D printed objects fabricated using VAT photopolymerization, the mechanical properties thereof are dependent upon fabrication parameter choices. However, control and consistency of the mechanical properties is problematic as factors such as light source power, wavelength, fabrication speed, and liquid photocurable composition, among others, affect the curing or hardening of the liquid photocurable composition. This challenge is compounded when fabricating liquid photocurable compositions having fillers therein, such as ceramic particles for fabricating 3D printed ceramic objects; whereby, de-binding and sintering, in addition to shaping, is required.

Fabrication of VAT photopolymerized 3D printed ceramic objects has become popular, as quality and economic viability have improved. However, the 3D printed mechanical properties thereof depend highly on the homogeneous distribution of the ceramic particles in the cured liquid photocurable composition throughout the 3D printing process for shaping, and its effect on the 3D printed ceramic object following de-binding and sintering. Particle packing or filler density, dominated by gravitational and interparticle forces and the stability of the liquid photocurable composition over time, causes the mechanical properties of each layer of a shaped 3D printed object to differ. The differences are further exacerbated following de-binding and sintering, which decreases the quality of the 3D printed object and 3D printing consistency.

SUMMARY

Additive manufacturing (AM) systems and methods for three-dimensional (3D) fabrication of a composition (or composition from herefourth) are provided.

In some embodiments, the AM system comprises a vat assembly having a vat, a pump, and a density control reservoir, wherein the vat holds the composition therein, and the pump system pumps the composition from the vat to the density control reservoir and then back into the vat. The vat comprises a bottom level having a first fluid outlet and an opening level having a second fluid outlet. The outlet conduits of the first and second fluid outlets intersect and extend to the density control reservoir, and an inlet conduit extends from the density control reservoir to the opening level of the vat. A density of the filler is greater than a density of a liquid of the composition.

The AM system further comprises an AM assembly operatively associated with the vat assembly, performing an AM irradiation method employing the liquid photocurable composition having the filler. AM irradiation methods include, but are not limited to, scan, spin, and selectively photocure (3SP), digital light processing (DLP) and stereolithography (SLA or SL) or other AM irradiation methods able to fabricate a 3D printed object from a composition employing top-down irradiation.

In some embodiments, the vat assembly further comprises at least one perforated outlet extension having at least one tube attachment mechanism and at least one elongated perforated tube assembly communicating therewith. The at least one perforated outlet extension is attached to the first fluid outlet or second fluid outlet, or both, if there are more than one perforated outlet extension, via the at least one tube attachment mechanism, expanding the area of fluid intake.

In some embodiments the at least one perforated outlet extension further comprises a plurality of elongated perforated tubes in communication with the tube attachment mechanism, disposed along at least one bottom level corner section of the vat, wherein the at least one bottom level corner section is a section having agglomerated filler.

In some embodiments, the bottom of the vat of the vat assembly is flat, funnel-shaped, or any combination thereof.

In some embodiments, the density control reservoir of the vat assembly comprises a heating mechanism, heating the composition from the conduits of the first and second fluid outlets to a predetermined temperature.

In some embodiments, the density control reservoir of the vat assembly further comprises a mixing mechanism, mixing the composition from the conduits of the first and second fluid outlets.

The AM assembly comprises a blade system operatively associated with the vat assembly and AM assembly, dispersing and cutting a top level and top surface, respectively, of the liquid photocurable composition having the filler in the vat of the vat assembly. In some embodiments the blade system comprises a dispersing blade and a cutting blade, pivoting on near ends thereof, moving back-and-forth in a semi-arc motion and in a z-direction, concurrently, independently or any combination thereof. The dispersing blade has an immersed start position and an immersed end position, opposite the immersed start position, dispersing the top level of the composition in the vat of the vat assembly without breaking a top surface of the composition and without generating bubbles. The cutting blade is disposed above the dispersing blade and has a start position, a downward ready position, an end position, opposite the start position, and an upward completion position. The cutting blade cuts the top surface of the composition in the vat of the vat assembly. In some embodiments, the dispersing blade comprises a plurality of dispersing blades and a central support, whereby the plurality of dispersing blades are centrally connected via the central support, and the dispersing blade disperses the composition from the inlet conduit extending from the density control reservoir toward and throughout a central top level of the composition, wherein the inlet conduit is disposed near to the immersed start position of the dispersing blade.

The build system comprises an elevatable assembly and an energy source delivery system. The elevatable assembly is operatively associated with the vat of the vat assembly and moves in an upward and downward z-direction via a build motor system operatively associated therewith. The blade system having the dispersing blade and cutting blade disperses and cuts the top level and top surface, respectively, of the composition in the vat. The energy source delivery system includes an energy source, and at least one optical device operatively associated with the energy source and elevatable assembly, and irradiates a layer of the composition over the elevatable assembly. The at least one optical device is configured to selectively redirect a light of the energy source to the elevatable assembly, wherein a cross-sectional layer of a 3D printed object is at least partially cured or hardened. The energy source emits at least one of ultraviolet (UV) radiation, infrared (IR) radiation, or visible light.

In some embodiments, an AM method configured to fabricate a 3D printed object from a composition (or composition from hereforth) comprises the steps of: Step (1810): providing a composition into a vat of a vat assembly to a predetermined level, wherein the vat assembly comprises the vat, a pump, and a density control reservoir; Step (1815): performing pre-operational steps, preparing an AM assembly of the AM system for irradiation of layers of the 3D printed object; and Step (1900): performing irradiation of the layers of the 3D printed object via an AM irradiation method of an AM assembly operatively associated with the vat assembly.

The vat of the AM method comprises a bottom level having a first fluid outlet and an opening level having a second fluid outlet. The outlet conduits of the first and second fluid outlets intersect and extend to the density control reservoir, and an inlet conduit extends from the density control reservoir to the opening level of the vat. A density of the filler is greater than a density of a liquid of the composition.

The AM assembly of the AM method comprises a blade system and a build system having an elevatable assembly and an energy source delivery system. The blade system comprises a dispersing blade and a cutting blade, pivoting on near ends thereof, moving back-and-forth in a semi-arc motion and in a z-direction, concurrently, independently or any combination thereof. The dispersing blade has an immersed start position and an immersed end position, opposite the immersed start position. The cutting blade is disposed above the dispersing blade and has a start position, a downward ready position, an end position, opposite the start position, and an upward completion position.

In some embodiments of the AM method, Step (1815) of the AM method comprises the steps of: Step (1820): lowering a build platform of the elevatable assembly into the composition of the vat; Step (1830): positioning the dispersing blade to the immersed start position; Step (1840): pumping the composition from the first fluid outlet and second fluid outlet of the vat to the density control reservoir and then back into the vat via the inlet conduit to a predetermined level and temperature range; Step (1850): dispersing the composition via the dispersing blade moving from the immersed start position to the immersed end position, without breaking the surface of the composition and without generating bubbles; and Step (1860): determining and comparing a top surface level of the composition in the vat with a stored predetermined top surface level range, if within the predetermined top surface level range, then yes, performing Step (1910), if no, repeating Step (1840).

In some embodiments of the AM method, the vat assembly of the AM method further comprises at least one perforated outlet extension having at least one tube attachment mechanism and at least one elongated perforated tube assembly communicating therewith. The at least one perforated outlet extension is attached to the first fluid outlet or second fluid outlet, or both, if there are more than one perforated outlet extension, via the at least one tube attachment mechanism, expanding the area of fluid intake from the first fluid outlet or second fluid outlet. The at least one perforated outlet extension comprises a plurality of elongated perforated tubes in communication with the tube attachment mechanism, disposed along at least one bottom level corner section of the vat, wherein the at least one bottom level corner section is a section having agglomerated filler.

In some embodiments of the AM method, the bottom of the vat of the vat assembly of the AM method is flat, funnel-shaped, or any combination thereof.

In some embodiments of the AM method, the density control reservoir of the vat assembly of the AM method comprises a heating mechanism, heating the composition from the conduits of the first and second fluid outlets to a predetermined temperature. In some embodiments of the AM method, the density control reservoir of the vat assembly further comprises a mixing mechanism, mixing the composition from the conduits of the first and second fluid outlets.

In some embodiments of the AM method, Step (1900) comprises the steps of: Step (1910): moving the elevatable assembly upwards in a z-direction to a layer thickness via the build motor system operatively associated therewith; Step (1920): positioning the cutting blade to the downward ready position and cutting a top surface of the composition in the vat of the vat assembly, moving to an end position and positioning the cutting blade to the upward completion position; Step (1930): irradiating a layer of the composition over a build platform via the AM irradiation method comprising an energy source delivery system of the build system, the energy source delivery system including an energy source and at least one optical device operatively associated with the elevatable assembly, selectively redirecting the energy source to the elevatable assembly, wherein a cross-sectional layer of a 3D printed object is at least partially cured, and wherein the energy source emits at least one of ultraviolet (UV) radiation, infrared (IR) radiation, or visible light; Step (1940): moving the elevatable assembly downwards in a z-direction by a distance greater than a layer thickness via a build motor system operatively associated therewith; Step (1950): re-positioning the blade system having the dispersing blade and the cutting blade to the immersed start position, respectively; Step (1960): determining if an additional layer is needed, if yes, performing Step (1970), if no, performing Step (2000); Step (1970): determining and comparing a top surface level of the composition in the vat with a stored predetermined top surface level range, if within the predetermined top surface level range, then yes, repeating Step (1850), if no, repeating Step (1840); and Step (2000): moving the elevatable assembly upwards in a z-direction to above the top surface of the composition via the build motor system operatively associated therewith.

In some embodiments of the AM method, the dispersing blade comprises a plurality of dispersing blades and a central support, whereby the plurality of dispersing blades are centrally connected via the central support. The dispersing blade disperses the composition from the inlet conduit extending from the density control reservoir toward and throughout a central top level of the composition, wherein the inlet conduit is disposed near to the immersed start position of the dispersing blade.

AM irradiation methods of the AM system of the AM method comprise scan, spin, and selectively photocure (3SP), digital light processing (DLP) and stereolithography (SLA or SL).

In some embodiments, a computer-readable medium comprising computer executable instructions which, when executed on a data processing apparatus, causes the data processing apparatus to perform an additive manufacturing (AM) method to fabricate a three-dimensional (3D) object from a composition comprises: Step (1810): providing a composition (or composition from hereforth) into a vat of a vat assembly to a predetermined level, wherein the vat assembly comprises the vat, a pump, and a density control reservoir; Step (1820): lowering a build platform of an elevatable assembly of a build system of an AM assembly into the composition of the vat; Step (1830): positioning a dispersing blade of a blade system to an immersed start position thereof; Step (1840): pumping the composition from a first fluid outlet and second fluid outlet of the vat to the density control reservoir and then back into the vat via an inlet conduit to a predetermined level range; Step (1850): dispersing the composition via the dispersing blade moving from the immersed start position to an immersed end position thereof, without breaking the surface of the composition and without generating bubbles; Step (1860): determining and comparing a top surface level of the composition in the vat with a stored predetermined top surface level range, if within the predetermined top surface level range, then yes, performing Step (1910), if no, repeating Step (1840); Step (1910): moving the elevatable assembly upwards in a z-direction to a layer thickness via the build motor system operatively associated therewith; Step (1920): positioning a cutting blade of a blade system, disposed above the dispersing blade, from a start position, to a downward ready position thereof and cutting a top surface of the composition in the vat, moving to an end position and positioning the cutting blade to an upward completion position thereof; Step (1930): irradiating a layer of the composition over a build platform via an AM irradiation method comprising an energy source delivery system of the build system, the energy source delivery system including an energy source and at least one optical device operatively associated with the elevatable assembly, selectively redirecting the energy source to the elevatable assembly, wherein a cross-sectional layer of a 3D printed object is at least partially cured, and wherein the energy source emits at least one of ultraviolet (UV) radiation, infrared (IR) radiation, or visible light; Step (1940): moving the elevatable assembly downwards in a z-direction by a distance greater than a layer thickness via a build motor system operatively associated therewith; Step (1950): re-positioning the blade system having the dispersing blade and the cutting blade to the immersed start position, respectively; Step (1960): determining if an additional layer is needed, if yes, performing Step (1970), if no, performing Step (2000); Step (1970): determining and comparing a top surface level of the composition in the vat with a stored predetermined top surface level range, if within the predetermined top surface level range, then yes, repeating Step (1850), if no, repeating Step (1840); and Step (2000): moving the elevatable assembly upwards in a z-direction to above the top surface of the composition via the build motor system operatively associated therewith.

Non-limiting examples and specific embodiments of the present application are explained in greater detail in the drawings herein and the specification set forth below.

BRIEF DESCRIPTION OF THE DRAWINGS

To assist those of ordinary skill in the relevant art in understanding the subject matter hereof, reference is made to the appended drawings, in which like reference numerals refer to similar elements.

Figure 1:
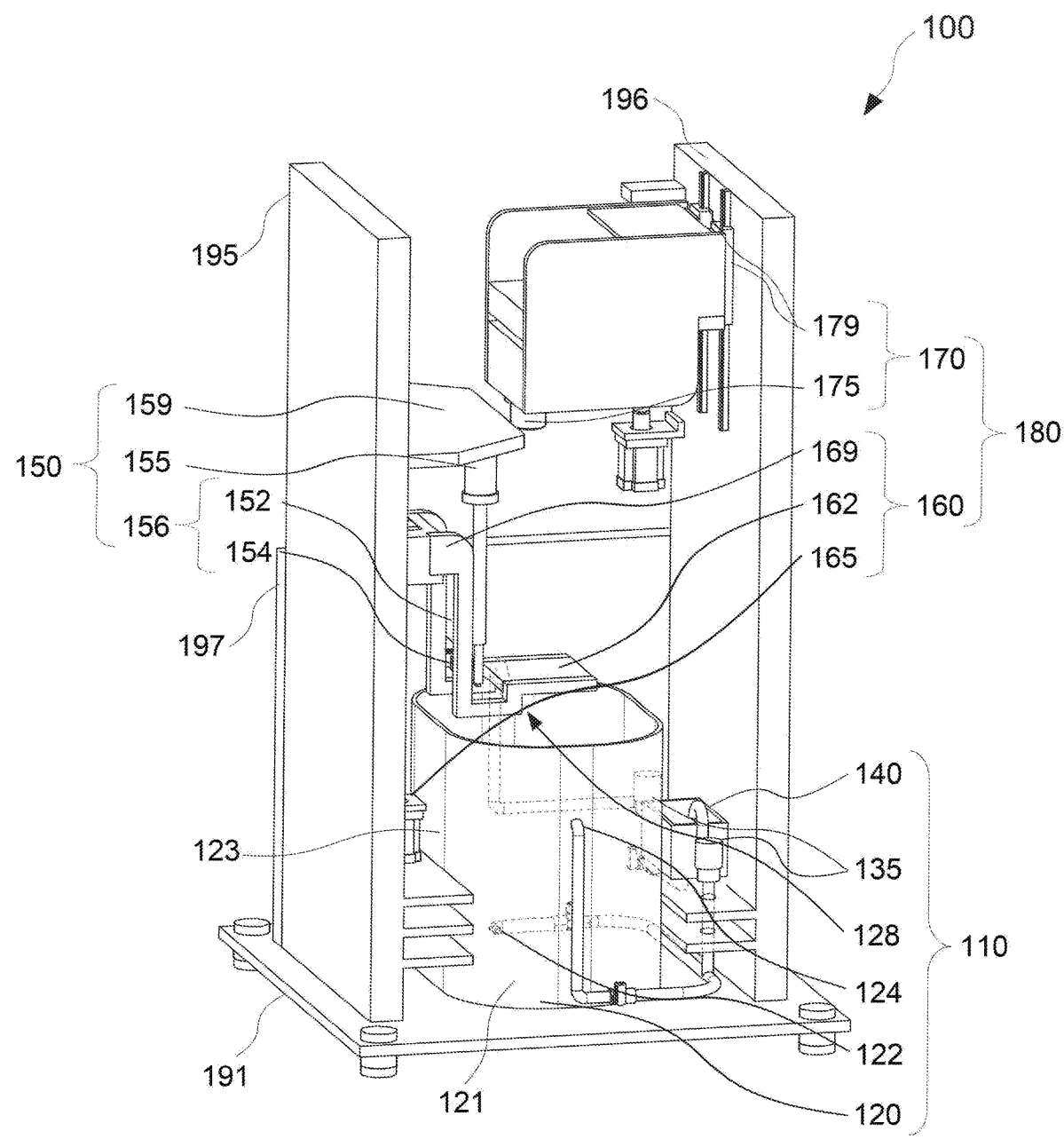
FIG. 1 is a schematic perspective first side view of an additive manufacturing (AM) system, according to an example embodiment.

It should be understood that the drawings are not to scale and that the disclosed embodiments are sometimes illustrated diagrammatically and in partial views. In certain instances, details that are not necessary for an understanding of the disclosed method and apparatus, or that would render other details difficult to perceive may have been omitted. It should be understood that the present application is not limited to the particular embodiments illustrated herein.

DETAILED DESCRIPTION

The present application is now described more fully hereinafter with reference to the accompanying drawings, in which embodiments are shown. Embodiments can, however, be embodied in many different forms and should not be construed as being limited to the various embodiments set forth herein; rather these embodiments are provided so that this disclosure will be thorough and complete and will fully convey the scope of example embodiments to those of ordinary skill in the relevant art.

Like numbers refer to like elements throughout. In the figures, the thickness of certain lines, layers, components, elements or features can be exaggerated for clarity. Where used, broken lines illustrate optional features or operations unless specified otherwise.

The terminology used herein is for the function of describing particular embodiments only and is not intended to be limiting the example embodiments. As used herein, the singular forms "a," "an" and "the" are intended to include plural forms as well, unless the context clearly indicates otherwise. It will be further understood that the terms "comprises" or "comprising," as used herein, encompass the notions of "including" and "having" and specify the presence of stated features, integers, steps, operations, elements components and/or groups or combinations thereof, but do not preclude the presence or addition of one or more other features, integers, steps, operations, elements, components and/or groups or combinations thereof.

The use of "as an example" or "such as" to list illustrative examples does not limit to only the listed examples. Thus, "as an example" or "such as" means "as an example, but not limited to" or "such as, but not limited to" and encompasses other similar or equivalent examples.

As used herein, the term "and/or" includes any and all possible combinations or one or more of the associated listed items, as well as the lack of combinations when interpreted in the alternative ("or").

As used herein, the terms "embodiment" or "present embodiment" are non-limiting terms and not intended to refer to any single aspect of the particular embodiment but encompass all possible aspects as described in the specification and the claims.

Unless otherwise defined, all terms (including technical and scientific terms) used herein have the same meaning as knowingly understood by one of ordinary skill in the art to which example embodiments belong. It will be further understood that terms, such as those defined in knowingly used dictionaries, should be interpreted as having a meaning that is consistent with their meaning in the context of the specification and claims and should not be interpreted in an idealized or overly formal sense unless expressly so defined herein. Well-known functions or constructions cannot be described in detail for brevity and/or clarity.

It will be understood that when an element is referred to as being "on," "assembled" to, "connected" to, "coupled" with, "contacting," etc., another element, it can be directly on, assembled to, connected to, coupled with and/or contacting the other element or intervening elements can also be present. In contrast, when an element is referred to as being, as an example, "directly on," "directly assembled" to, "directly connected" to, "directly coupled" with or "directly contacting" another element, there are no intervening elements present. It will also be appreciated by those of ordinary skill in the relevant art that references to a structure or feature that is disposed "adjacent" another feature can have portions that overlap or underlie the adjacent feature.

Spatially relative terms, such as "under," "below," "lower," "over," "upper" and the like, can be used herein for ease of description to describe an element's or feature's relationship to another element's or feature's as illustrated in the figures. It will be understood that the spatially relative terms are intended to encompass different orientations of the device in use or operation in addition to the orientation depicted in the figures. As an example, if the device in the figures is inverted, elements described as "under" or "beneath" other elements or features would then be oriented "over" the other elements or features. Thus the exemplary term "under" can encompass both an orientation of over and under. The device can otherwise be oriented (rotated 90 degrees or at other orientations) and the spatially relative descriptors used herein interpreted accordingly. Similarly, the terms "upwardly," "downwardly," "vertical," "horizontal" and the like are used herein for the function of explanation only, unless specifically indicated otherwise.

It will be understood that, although the terms first, second, etc., can be used herein to describe various elements, components, regions, layers and/or sections, these elements, components, regions, layers and/or sections should not be limited by these terms. Rather, these terms are only used to distinguish one element, component, region, layer and/or section, from another element, component, region, layer and/or section. Thus, a first element, component, region, layer or section discussed herein could be termed a second element, component, region, layer or section without departing from the teachings of the present application. The sequence of operations (or steps) is not limited to the order presented in the claims or figures unless specifically indicated otherwise.

3D printed ceramic objects are used in a wide range of fields, including the chemical, machinery, electronics, aerospace and biomedical engineering fields. 3D printed ceramic objects have high mechanical strength and hardness, good thermal and chemical stability and viable thermal, optical, electrical and magnetic performance.

Example embodiments as disclosed herein are directed to additive manufacturing (AM) systems and methods configured to fabricate a 3D printed object from a composition, such as ceramic powder. Generally, thin liquid layers of ceramic powder in monomer are cured by polymerization with a light source to fabricate a ceramic green body from a CAD file. In some embodiments, the liquid photocurable composition consist of photoinitiators, photocurable monomers (and/or oligomers), and ceramic powder. Following illumination, the photoinitiator in the composition generates active radical or cation species that attack double bonds in the monomer, initiating polymerization. In some embodiments, the photoinitiator, as an example, and not to be limiting, is a free radical initiator, and the photopolymerization mechanism employed is radical polymerization. Following, the polymer chains grow until they lose their activity by termination processes following subsequent reactions between active chain ends and the monomers. If the monomers have more than one functional group participating in polymerization, cross-linked networks of polymer chains are generated rather than linear chains. The polymer network generated by photopolymerization holds the ceramic particles of the ceramic powder in its matrix to shape the 3D structure of the ceramic green body. In some embodiments, the ceramic particles are, as an example, and not to be limiting, made of $SiO_2$, $Al_2O_3$, $ZrO_2$ or $SiC$. After, the ceramic green body is subjected to a pyrolysis process to remove organics therein and a sintering process for fabrication of a complex geometric 3D printed ceramic object having smooth surfaces.

Generally, for high quality, dense ceramics, the ceramic powder loading in green bodies must be high, to mitigate excessive shrinkage. As ceramic solid loading increases, the suspension viscosity also increases. In some embodiments, the ceramic solid loading is, as an example, and not to be limiting, about 10 vol % to 60 vol %. The time required to cure the composition is dependent on the light source velocity, composition sensitivity, and critical energy dose. The composition sensitivity is dependent on the solid loading, ceramic particle size, and the refractive indices of the monomer and ceramic powder. In some embodiments, the ceramic particle sizes are, as an example, and not to be limiting, from 0.05 μm to 10 μm.

Those of ordinary skill in the relevant art may readily appreciate that any suitable photoinitiator, photocurable monomer (and/or oligomer), and ceramic powder, in any suitable form or vol % may be employed in the composition of the embodiments for application-specific 3D printed ceramic objects. Also, those of ordinary skill in the relevant art may readily appreciate that additional additives may be added to the composition, as an example, pigments, dyes etc. and the embodiments are not limited thereto. As long as thin liquid layers of ceramic powder in monomer may be cured by polymerization with a light source to fabricate a ceramic green body from a CAD file, and then after, the ceramic green body may be subjected to a pyrolysis process and a sintering process for fabrication of a complex geometric 3D printed ceramic object having smooth surfaces.

FIG. 1 is a schematic perspective first side view of an additive manufacturing (AM) system, according to an example embodiment. Referring to FIG. 1, in some embodiments, the AM system 100 comprises a vat assembly 110 having a vat 120, a pump system 135, and a density control reservoir 140, wherein the vat 120 holds a composition therein, and the pump system 135 pumps the composition from the vat 120 to the density control reservoir 140 and then back into the vat 120. The vat 120 comprises a bottom level 121 having a first fluid outlet 122 and an opening level 123 having a second fluid outlet 124. The first and second fluid outlets 122, 124 intersect and extend to the density control reservoir 140, and an inlet conduit 128 extends from the density control reservoir 140 to the opening level of the vat 120. A density of the filler, as an example, and not to be limiting, such as a ceramic powder, is greater than a density of a liquid of the composition.

The AM system 100 further comprises an AM assembly comprising a blade system 150 and a build system 180 having an elevatable assembly 160 and an energy source delivery system 170, operatively associated with the vat assembly 110, performing an AM irradiation method employing the composition. As an example, and not to be limiting, AM irradiation methods include, scan, spin, and selectively photocure (3SP), digital light processing (DLP) and stereolithography (SLA or SL) or other AM irradiation methods able to fabricate a 3D printed object from a composition employing top-down irradiation.

The AM system 100 further comprises a platform 191, first supporting wall 195, second supporting wall 196, and third supporting wall 197. The second supporting wall 196 is opposite the first supporting wall 195 and the third supporting wall 197 is between the first supporting wall 195 and second supporting wall 196 on ends thereof, forming a U-shape. The first, second, and third supporting walls 195, 196, 197 are securely attached to the platform, as an example, and not to be limiting, by welding, brackets or any tightening means made of an appropriate material for the environment of the embodiments, or combinations thereof. In an embodiment, the height of the third supporting wall 197 is a little over one half the height of the first and second supporting walls 195, 196; however, the embodiments are not limited thereto. In alternative embodiments, the height of the third supporting wall 197 may be lower or higher than a little over one half the height of the first and second supporting walls 195, 196 or the same height as the first and second supporting wall 195, 196, dependent upon positioning of the systems and devices of the AM assembly and vat assembly 110. Generally, the height of the third supporting wall 197 may be higher than the vat 120.

In some embodiments, the platform 191 and first, second, and third supporting walls 195, 196, 197 of the AM system 100 are made of metal and support the vat 120, pump system 135, and density control reservoir 140 of the vat assembly 110 and build system 180 having the elevatable assembly 160 and energy source delivery system 170 of the blade system 150 of the AM assembly; however, the embodiments are not limited thereto. Those skilled in the relevant art may readily appreciate that the platform 191 and first, second, and third supporting walls 195, 196, 197 may be made by any type of appropriate material for the environment of the embodiments, and may be modified in any appropriate way, so long as they are able to support the vat 120, pump system 135, an density control reservoir 140, and build system 180 having the elevatable assembly 160 and energy source delivery system 170 of the blade system 150. As an example, and not to be limiting, the platform 191 and first, second, and third supporting walls 195, 196, 197 may be made of stainless steel or powder coated steel.

Figure 2A:
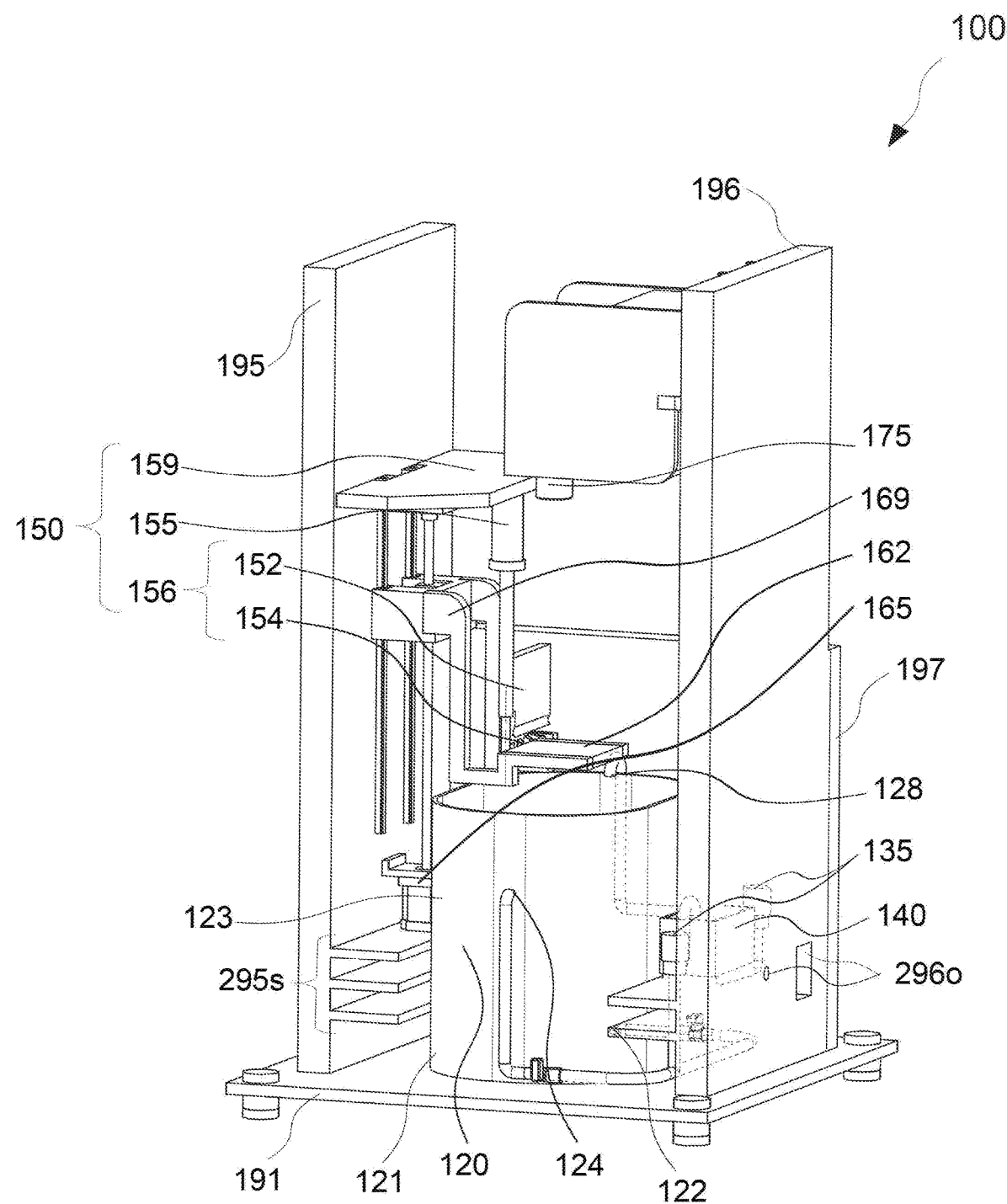
FIG. 2A is a schematic perspective second side view of the additive manufacturing (AM) system of FIG. 1, according to an example embodiment.
Figure 2B:
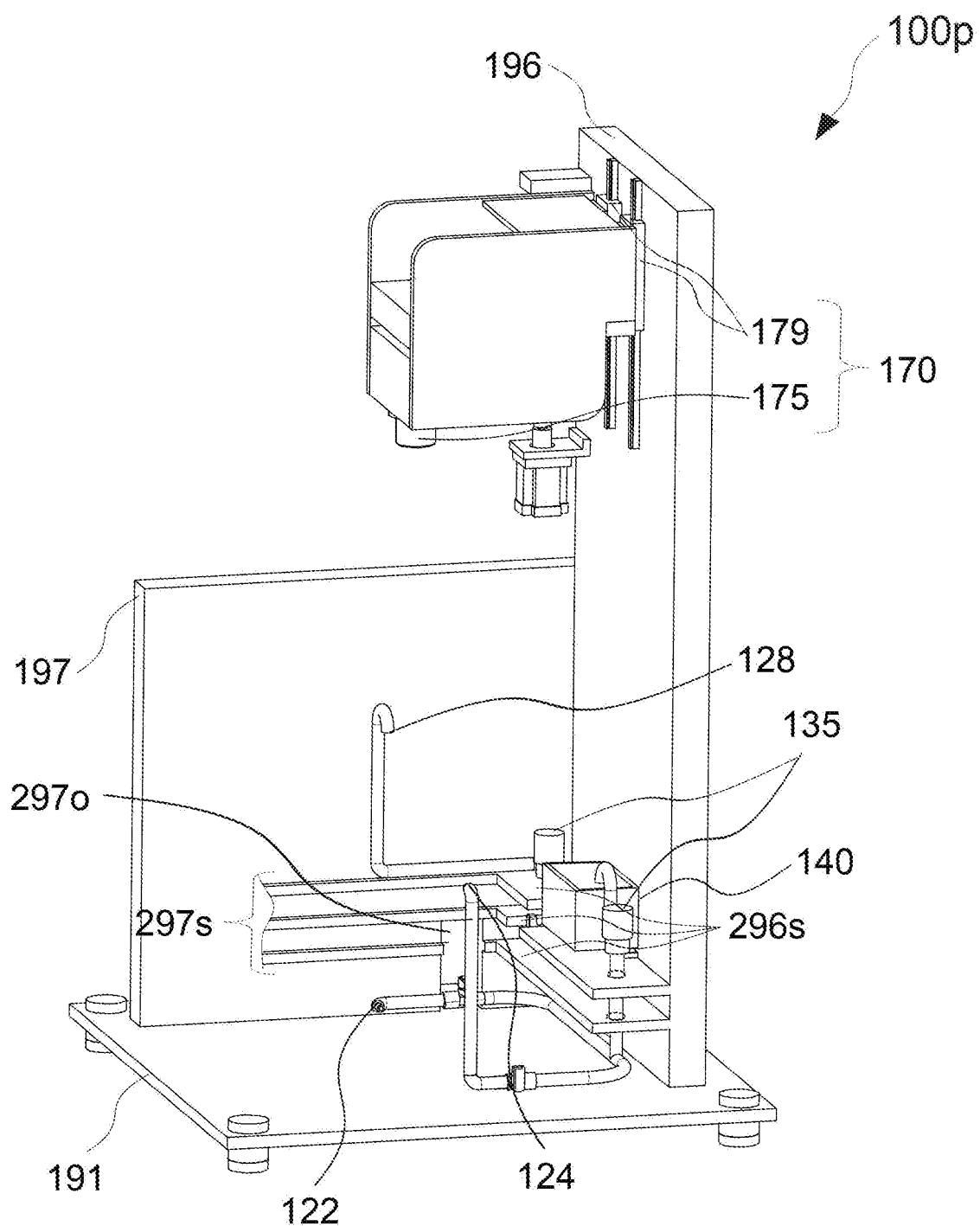
FIG. 2B is a schematic perspective first side view of a portion of the additive manufacturing (AM) system of FIG. 1, according to an example embodiment.

In some embodiments, the first, second, and third supporting walls 195, 196, 197 of the AM system 100 comprise accessible openings, for inspection, maintenance and/or parts replacement. FIG. 2A is a schematic perspective second side view of the additive manufacturing (AM) system of FIG. 1, according to an example embodiment. FIG. 2B is a schematic perspective first side view of a portion of the additive manufacturing (AM) system of FIG. 1, according to an example embodiment. Referring to FIGS. 2A and 2B, and referring to FIG. 1, the AM system 100 further comprises a plurality of second openings 296o through the second supporting wall 196 and a third opening 297o through the third supporting wall 197. The plurality of second openings 296o are positioned near to the pump system 135 and density control reservoir 140 and the third opening 297o is positioned near to the first fluid outlet 122; however, the embodiments are not limited thereto. Those of ordinary skill in the relevant art may readily appreciate that other accessible openings may be made through the first, second, and third supporting walls 195, 196, 197 for inspection, maintenance and/or parts replacement, or piping, electrical cords or wiring etc., that may need to be extended from an outer side of the first, second, and third supporting walls 195, 196, 197 thereinto, for operation of the AM system 100, and the embodiments are not limited thereto.

In some embodiments, the first, second, and third supporting walls 195, 196, 197 further comprise at least one shelf, fixing and supporting the systems and devices of the AM system 100. Referring to FIGS. 2A and 2B, and referring to FIG. 1, the AM system 100 further comprises a plurality of first shelves 295s, extending outward from the first supporting wall 195, a plurality of second shelves 296s, extending outward from the second supporting wall 196 and a plurality of a third shelves 297s, extending outward from the third supporting wall 197. The plurality of first, second and third shelves 295s, 296s, 297s, respectively, hinder movement of the vat 120 of vat assembly 110 in two opposing side directions and one backward direction. In some embodiments, the vat 120 is secured flush with at least a portion of the plurality of first, second and third shelves 295s, 296s, 297s, respectively, to fix and support the vat 120 and mitigate movement thereof. In some embodiments, the plurality of first shelves 295s fix and support mechanisms of the elevatable assembly 160, the plurality of second shelves 296s fix and support the pump system 135 and density control reservoir 140, and the plurality of a third shelves 297s fix and support the inlet conduit 128; however, the embodiments are not limited thereto. Those of ordinary skill in the relevant art may readily appreciate that the plurality of first, second and third shelves 295s, 296s, 297s, respectively, may fix and support other devices and systems of the AM system 100. As an example, and not to be limiting, the plurality of first, second and third shelves 295s, 296s, 297s, respectively, may be employed to support other mechanical, electrical-related and/or non-electrical related devices or systems of the AM system 100, as long as the plurality of first, second and third shelves 295s, 296s, 297s, respectively, fix and support the vat 120 and mitigate movement thereof. In some embodiments, the plurality of first, second and third shelves 295s, 296s, 297s are made of steel, stainless steel, powder coated steel, or other rigid materials, or any combination thereof and the embodiments are not limited thereto. As long as the plurality of first, second and third shelves 295s, 296s, 297s may be employed to hinder movement of the vat 120 in two opposing side directions and one backward direction, and support mechanical, electrical-related and/or non-electrical related devices or systems of the AM system 100

In some embodiments, the blade assembly 150 and elevatable assembly 160 are assembled to the first supporting wall 195 and the energy source delivery system 170 is assembled to the second supporting wall 196; however, the embodiments are not limited thereto. Those of ordinary skill in the relevant art may readily appreciate that the blade assembly 150, elevatable assembly 160, and energy source delivery system 170 may be assembled to the first, second, and/or third supporting wall 195, 196, 197 depending upon type and size of the blade assembly 150, elevatable assembly 160, and energy source delivery system 170, and the embodiments are not limited thereto. As long as thin liquid layers of ceramic powder in monomer may be cured by polymerization with a light source of the energy source delivery system 170 to fabricate a ceramic green body from a CAD file. The energy source delivery system 170 comprises a tightening means, to secure the energy source delivery system 170 in place after moving and adjusting to desired parameters.

Figure 3:
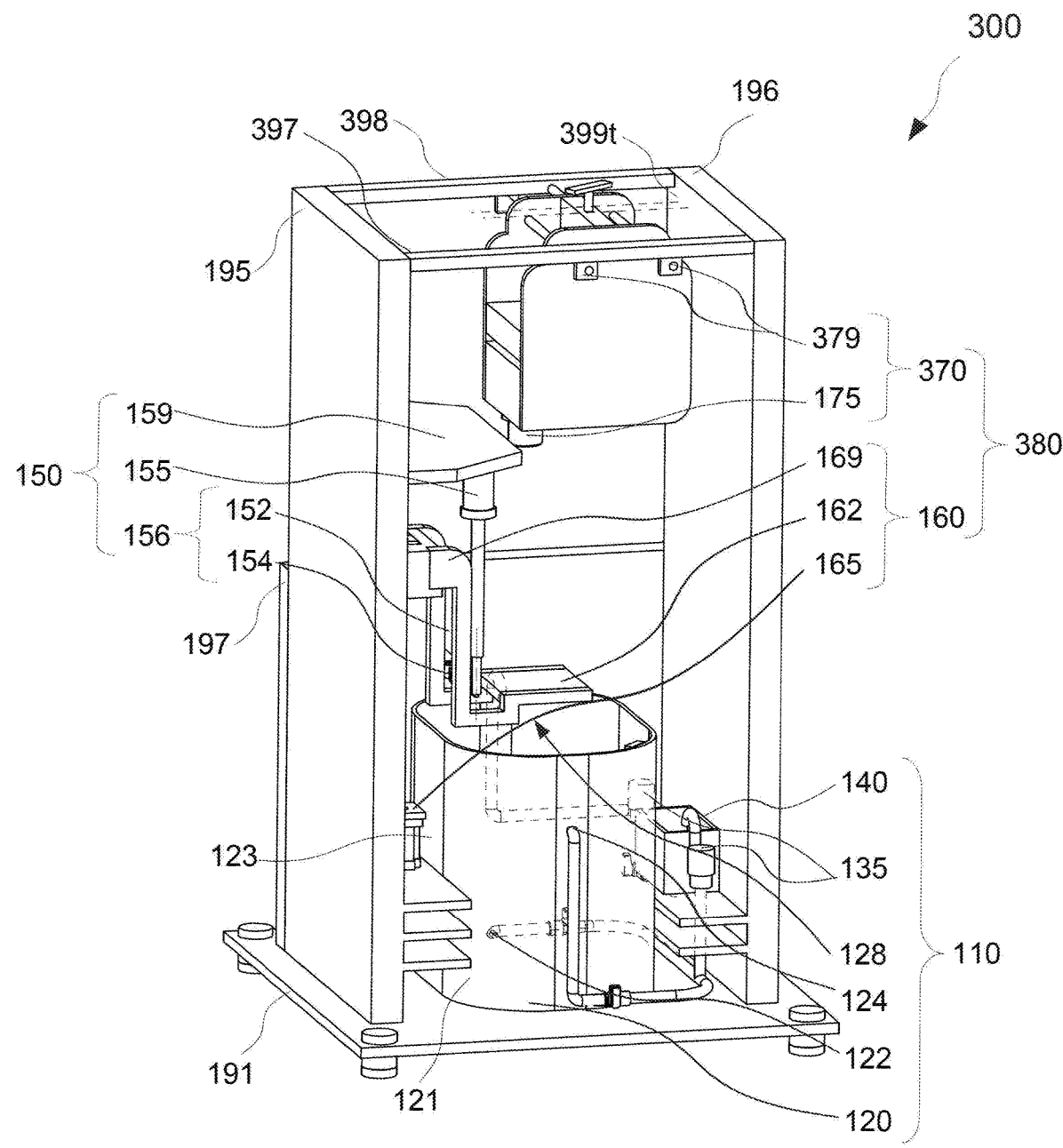
FIG. 3 is a schematic perspective first side view of an alternative additive manufacturing (AM) system, according to an example embodiment.

FIG. 3 is a schematic perspective first side view of an alternative additive manufacturing (AM) system, according to an example embodiment. Referring to FIG. 3, and referring to FIGS. 1 to 2B, the delivery system support 379 is not moveably attached to a railing system of the second supporting wall 196 and instead moveably attached to a first rail support 397 and a second rail support 398, opposite the first rail support 397 of the AM system 300 and can be adjusted up-and-down in a z-direction and forward and back. The first and second rail support 397, 398 extend outward from opposing corner edges of the first supporting wall 195, longitudinally to opposing corner edges of the second supporting wall 196. The energy source delivery system 370 is moveably adjustable along the first and second rail supports 397, 398 and is securable via a top screw-like tightening means. Those of ordinary skill in the relevant art may readily appreciate that different types and amounts of rail supports and different tightening means may be employed in the embodiments for assembly and tightening of the energy source delivery system 370 to the AM system 100. As long as the energy source delivery system 370 is moveably adjustable, and may be secured in place and thin liquid layers of ceramic powder in monomer may be cured by polymerization with a light source of the energy source delivery system 370 to fabricate a ceramic green body from a CAD file. In some embodiments, the AM system 300 further comprises a transparent top cover 399t, for a more sterile operating environment for performing the AM irradiation method employing the composition. The transparent top cover 399t comprises a longitudinal opening, for movement, adjustment and screw-like tightening of the energy source delivery system 370.

Figure 4:
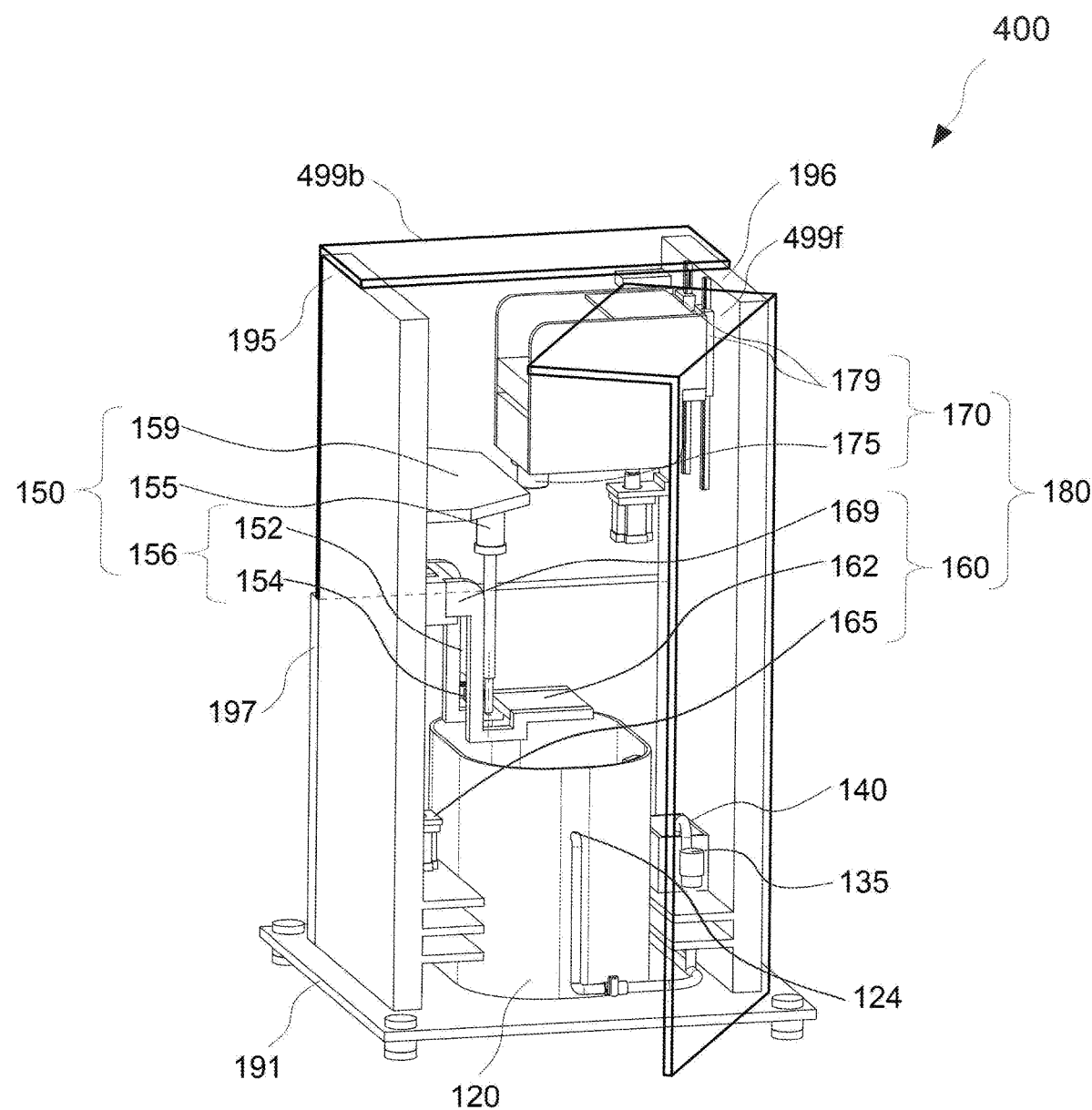
FIG. 4 is a schematic perspective first side view of another alternative additive manufacturing (AM) system, according to an example embodiment.

FIG. 4 is a schematic perspective first side view of another alternative additive manufacturing (AM) system, according to an example embodiment. Referring to FIG. 4, and referring to FIGS. 1 to 3, the AM system 400 may further comprise a rotatable first transparent cover 499b and second transparent cover 499f, providing a more sterile operating environment for performing the AM irradiation method employing the composition, while still allowing for maintenance, parts replacement or filling of the vat 120. In some embodiments, the second transparent cover 499f is rotatably attached to a front side of the second supporting wall 196 and the first transparent cover 499b is rotatably attached to a back side of the first supporting wall 195; both are rotatably opened and closed from left to right.

Those skilled in the relevant art may readily appreciate that the top cover 399t and first and second transparent cover 499b, 499f may be made of any type of appropriate material for the environment of the embodiments, as an example, and not to be limiting, acrylic plastic having different resistances such temperature or uv resistance etc. Also, the covers may be modified in any appropriate way, so long as they are rotatable and provide a more sterile operating environment while still allowing for maintenance, parts replacement or filling of the vat 120.

In some embodiments, the vat 120 of the vat assembly 110 is firmly secured to the platform 191 by welding; however, the embodiments are not limited thereto. The vat 120 may be secured to the platform 191 by any type of bracket, clamp or tightening means made of an appropriate material for the environment of the embodiments, or any combination thereof.

Those skilled in the relevant art may readily appreciate that additional modifications may be made to the platform 191 or vat 120 in order to increase convenience of the AM system 100 while firmly securing the vat 120 thereto. As an example, and not to be limiting, the vat 120 may further comprise a protrusion, extending downward about 5 mm, and about 5 mm in width, and about 5 mm distance from a bottom edge perimeter of the vat 120, fitting directly into a corresponding groove within the platform, about 5 mm in depth and 5 mm in width. The bottom of the vat 120 fits securely on a top surface of the platform 191. In another example, the platform 191 may be indented about 5 mm, corresponding to the bottom surface of the vat 120, such that the bottom surface of the vat 120 fits securely and directly within the indention of the platform for a tight and secure fit. Further, in alternative embodiments, the vat 120 may be moveable, before being secured to the platform 191 by any type of bracket, clamp or tightening means made of an appropriate material for the environment of the embodiments.

Figure 5:
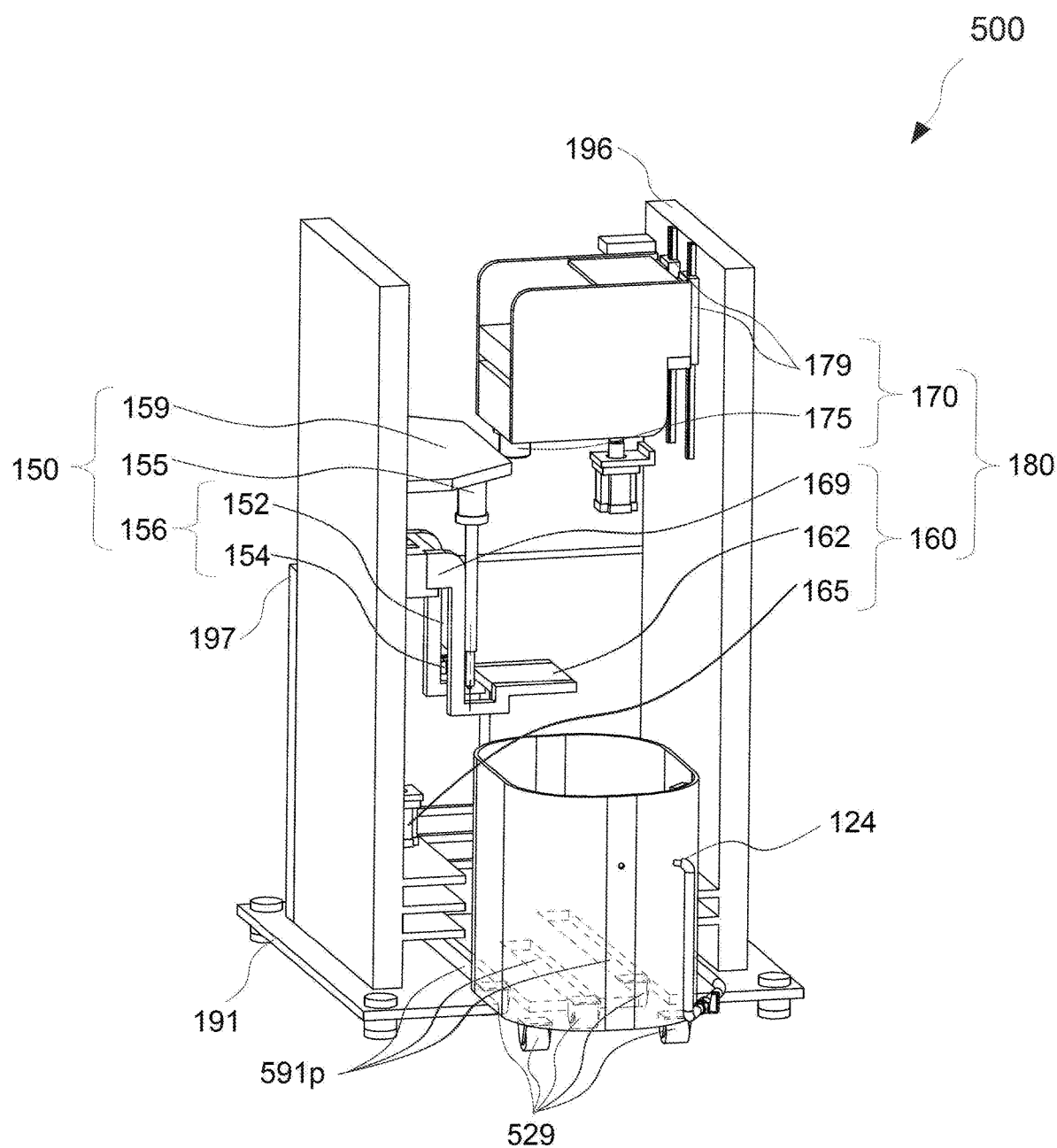
FIG. 5 is a schematic perspective first side view of yet another alternative additive manufacturing (AM) system, according to an example embodiment.

FIG. 5 is a schematic perspective first side view of yet another alternative additive manufacturing (AM) system, according to an example embodiment. Referring to FIG. 5, and referring to FIGS. 1 to 4, the vat 520 further comprises a plurality of wheels 529 attached to a bottom thereof and the platform 591 comprises a plurality of passageways 591p corresponding to the plurality of wheels 529 of the vat 520. In some embodiments, the amount of the plurality of wheels 529 and the plurality of passageways 591p is five and three, respectively, and the vat 520 may be outwardly moved from a secure and unmovable position, via the plurality of wheels 529 and plurality of passageways 591p, to an outer position for maintenance, parts replacement or filling of the vat 520. Those skilled in the relevant art may readily appreciate that additional modifications may be made to the platform 591 or vat 520 in order to move the vat 520 from a secure and unmovable position, to an outer position for maintenance, parts replacement or filling of the vat 520. As an example, and not to be limiting, the vat may be firmly secured to a moveable platform on top of the platform 591, employing slide railing for movement, and the embodiments are not limited thereto. As long as the vat 520 may be outwardly moved from a secure and unmovable position, and then moved backed and secured to the AM system 500, whereby the plurality of first, second and third shelves 295s, 296s, 297s, respectively, hinder movement of the vat 520 of vat assembly 510 in two opposing side directions and one backward direction.

In some embodiments, the pump system 135, periodically pumps the composition in the vat 120 from the first fluid outlet 122 at the bottom level 121 of the vat 120 and second fluid outlet 124 at the opening level 123 of the vat 120 to the density control reservoir 140 and then back into the vat 120 via the inlet conduit 128. The pumping of the vat composition from the bottom and opening levels 121, 126 ensures that two different composition ceramic particle densities are mixed together via confluence when entering the density control reservoir 140. In some embodiments, the area of composition intake is further expanded.

Figure 6A:
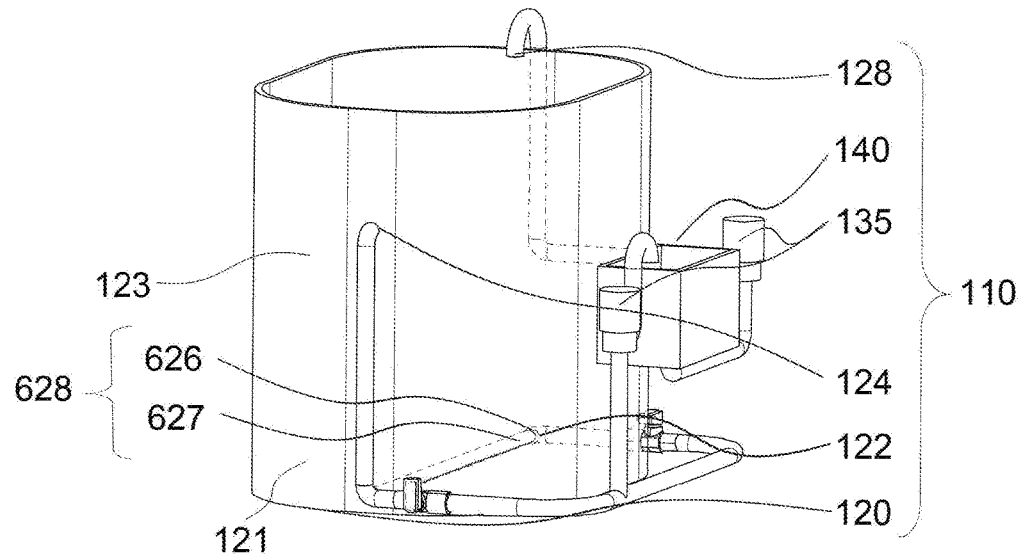
FIG. 6A is a schematic perspective second side view of a vat assembly having at least one perforated outlet extension, according to an example embodiment.
Figure 6B:
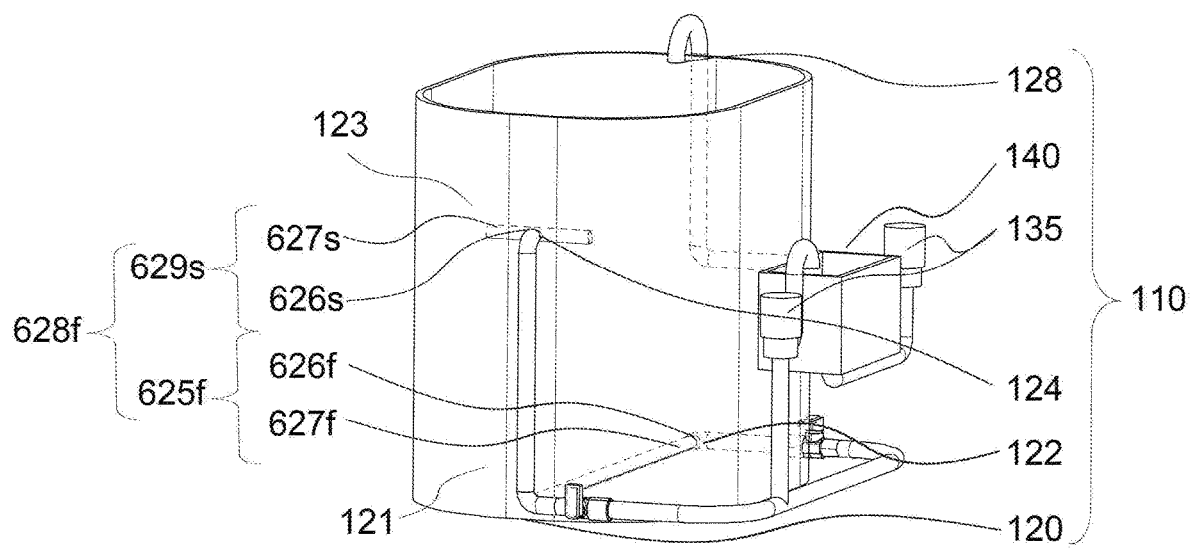
FIG. 6B is a schematic perspective second side view of the vat assembly of FIG. 6A having an alternative at least one perforated outlet extension, according to an example embodiment.
Figure 6C:
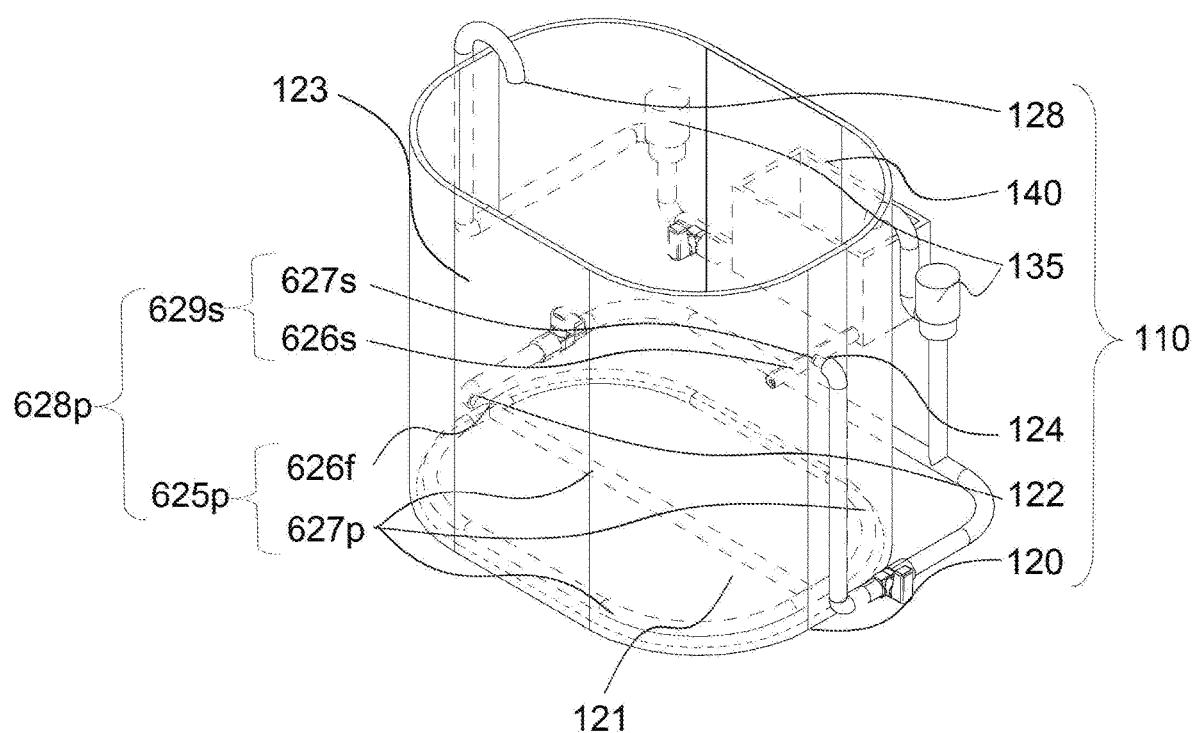
FIG. 6C is a schematic perspective first side view of the vat assembly of FIG. 6A having another alternative at least one perforated outlet extension, according to an example embodiment.

FIG. 6A is a schematic perspective second side view of a vat assembly having at least one perforated outlet extension, according to an example embodiment. FIG. 6B is a schematic perspective second side view of the vat assembly of FIG. 6A having an alternative at least one perforated outlet extension, according to an example embodiment. FIG. 6C is a schematic perspective first side view of the vat assembly of FIG. 6A having another alternative at least one perforated outlet extension, according to an example embodiment. Referring to FIGS. 6A to 6C, and referring to FIGS. 1 to 5, the vat assembly 110 further comprises at least one perforated outlet extension 628 having at least one tube attachment mechanism 626 and at least one elongated perforated tube assembly 627 communicating therewith, expanding the area of composition intake into the density control reservoir 140 from the vat 120. In some embodiments, the at least one elongated perforated tube assembly 627 may communicate directly with the first fluid outlet 122 or second fluid outlet 124, or both, without the at least one tube attachment mechanism 626, as long as composition intake into the density control reservoir 140 from the vat 120 may be efficiently performed.

In some embodiments, the amount of the at least one perforated outlet extension 628 is one, and the at least one tube attachment mechanism 626 is removably attached to the first fluid outlet 122 on one end and the at least one elongated perforated tube assembly 627 on an opposite end; however, the embodiments are not limited thereto. Those of ordinary skill in the relevant art may readily appreciate that any amount, in any elongated size, shape or form, of the at least one tube attachment mechanism and at least one elongated perforated tube assembly may be employed in the embodiments, as long as the at least one perforated outlet extension 628 may be attached to the first fluid outlet 122 or second fluid outlet 124, or both, if there are more than one perforated outlet extension, via the at least one tube attachment mechanism or directly, expanding the area of composition intake. In alternative embodiments, the at least one perforated outlet extension 628f comprises a first perforated outlet extension 625f and a second perforated outlet extension 629s. The first perforated outlet extension 625f comprises a first tube attachment mechanism 626f, removably attached to a first elongated perforated tube assembly 627f, which in turn is removably attached to the first fluid outlet 122. The second perforated outlet extension 629s comprises a second tube attachment mechanism 626s, removably attached to a second elongated perforated tube assembly 627s, which in turn is removably attached to the second fluid outlet 124. In other alternative embodiments, the at least one perforated outlet extension 628p comprises a first perforated outlet extension 625p and a second perforated outlet extension 629s. The first perforated outlet extension 625p comprises a first tube attachment mechanism 626f, removably attached to a plurality of elongated perforated tubes assembly 627p having a plurality of attached elongated perforated tubes, which in turn are removably attached to the first fluid outlet 122. The second perforated outlet extension 629s comprises a second tube attachment mechanism 626s, removably attached to a second elongated perforated tube assembly 627s, which in turn is removably attached to the second fluid outlet 124. The plurality of attached elongated perforated tubes is in fluid communication with the first tube attachment mechanism 626f and is disposed along a bottom level 121 of the vat 120. In some embodiments, at least a portion of the plurality of attached elongated perforated tubes is disposed along a bottom level 121 corner section of the vat 120, wherein the at least one bottom level 121 corner section is a section having agglomerated filler.

Figure 7A:
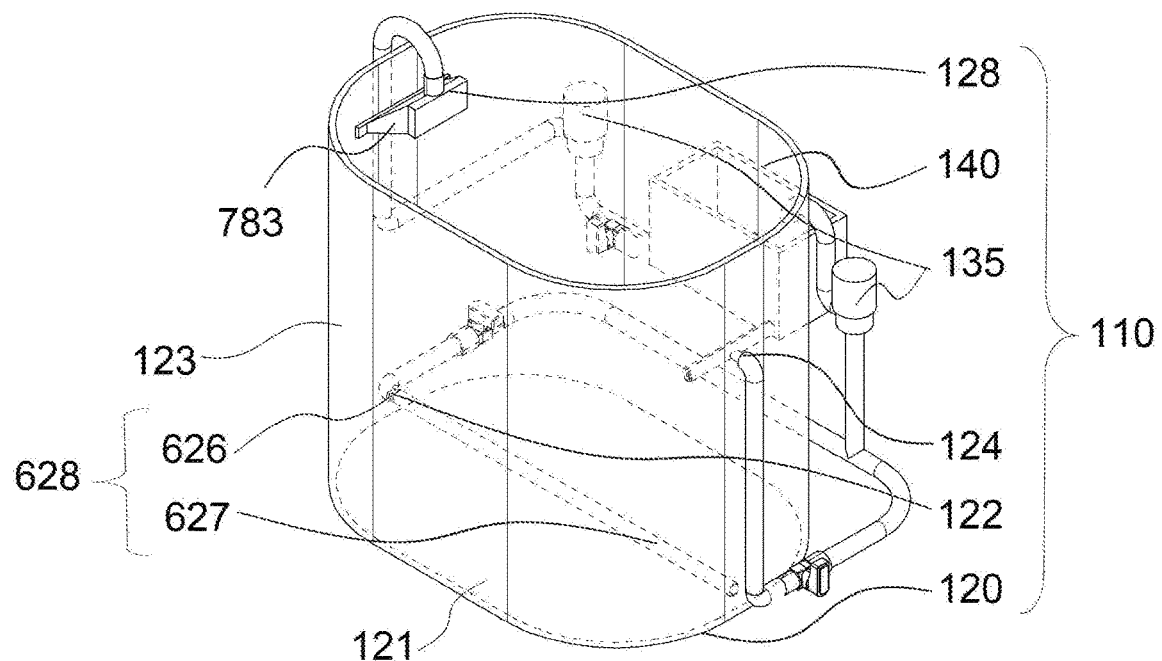
FIG. 7A is a schematic perspective second side view of the vat assembly of FIG. 6A having an alternative at least one perforated outlet extension and an inlet flow assembly, according to an example embodiment.
Figure 7B:
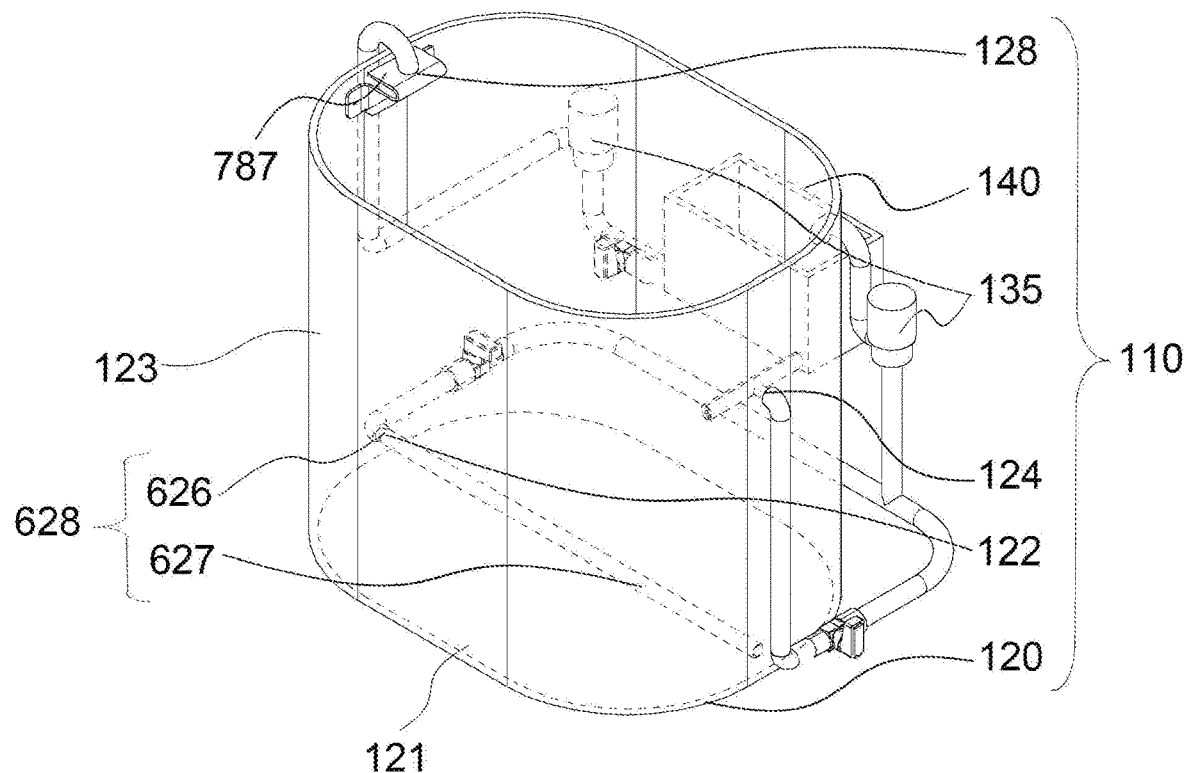
FIG. 7B is a schematic perspective second side view of the vat assembly of FIG. 6A having an alternative at least one perforated outlet extension and an alternative inlet flow assembly, according to an example embodiment.

In some embodiments, the composition flowing back into the vat 120 via the inlet conduit 128 may be diverted to mitigate bubbles or turbulence from occurring when entering the composition in the vat 120. FIG. 7A is a schematic perspective second side view of the vat assembly of FIG. 6A having an alternative at least one perforated outlet extension and an inlet flow assembly, according to an example embodiment. Referring to FIG. 7A, and referring to FIGS. 1 to 6C, a first inlet flow assembly 783 is assembled to the inlet conduit 128 of the vat 120. The first inlet flow assembly 783 is integrally formed and opened on a top side thereof. In some embodiments, the composition from the inlet conduit 128 flows into the first inlet flow assembly 783 and spreads out before flowing against a wall of the vat 120, before flowing into the composition in the vat 120; however, the embodiments are not limited thereto. FIG. 7B is a schematic perspective second side view of the vat assembly of FIG. 6A having an alternative at least one perforated outlet extension and an alternative inlet flow assembly, according to an example embodiment. Referring to FIG. 7B, and referring to FIGS. 1 to 7A, a second inlet flow assembly 787 is assembled to the inlet conduit 128 of the vat 120. The second inlet flow assembly 787 is integrally formed and opened on opposing sides thereof. Those of ordinary skill in the related art may readily appreciate that other designs may be employed to spread the flow of the composition from the inlet conduit 128 before entering the composition in the vat 120. As long as the composition from the inlet conduit 128 flows into the inlet flow assembly and spreads out before flowing against a wall of the vat 120, and then flows into the composition in the vat 120, mitigating bubbles and turbulence when entering the composition. In some embodiments, flow grooves or channels, as an example, and not to be limiting, may also be embedded in the bottom of the inlet flow assembly for directed flow of the composition from the inlet conduit 128.

Figure 8A:
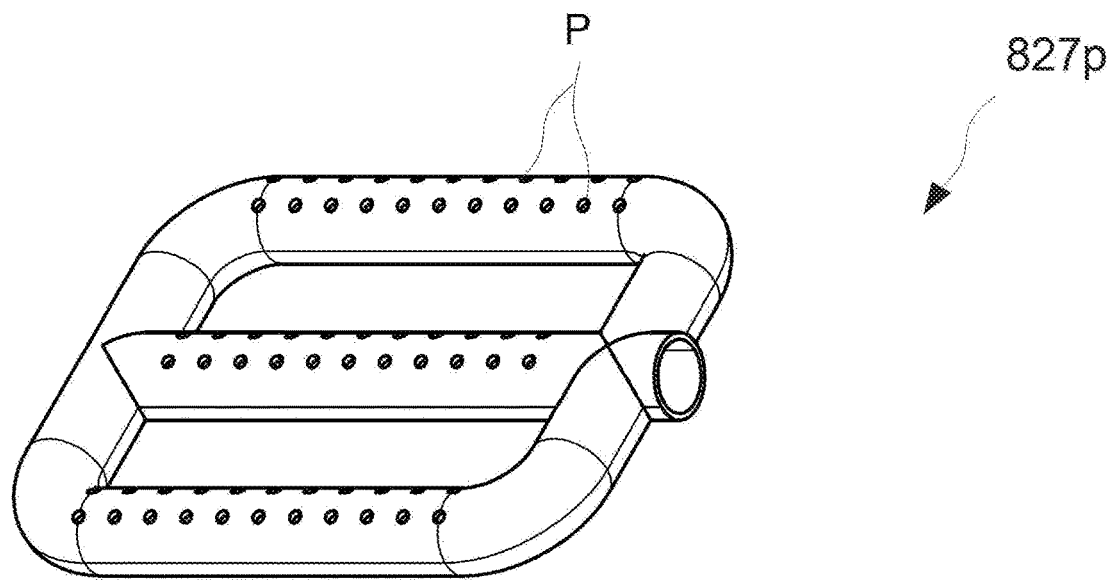
FIG. 8A is a schematic perspective second side view of a plurality of elongated perforated tubes assembly in relative detail, according to an example embodiment.
Figure 8B:
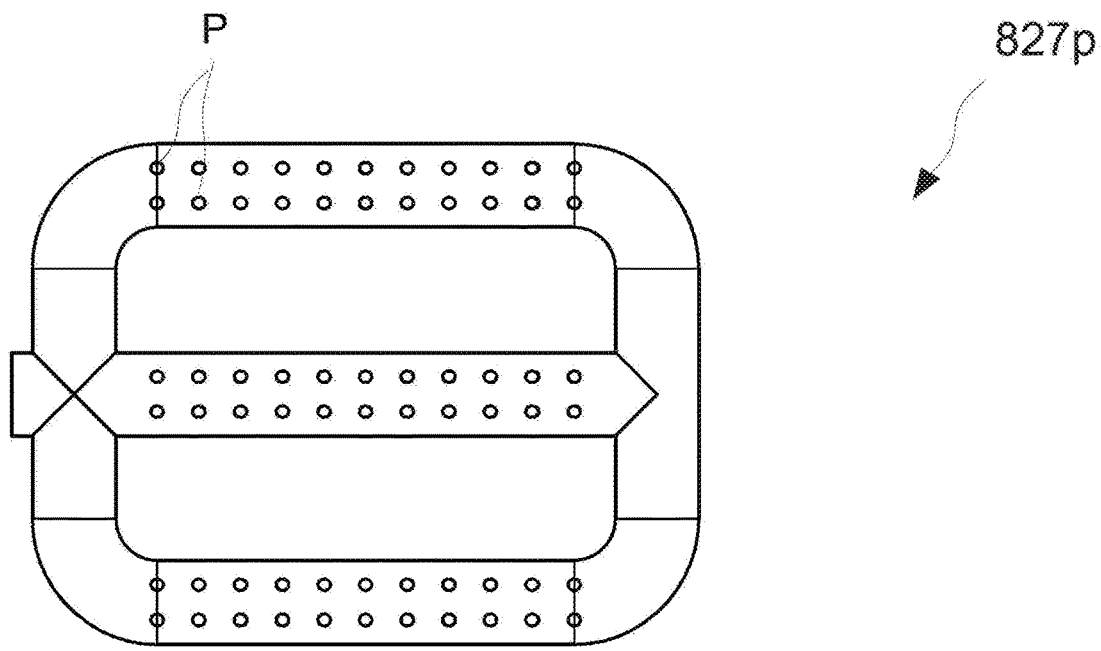
FIG. 8B is a plane bottom side view of the plurality of elongated perforated tubes assembly of FIG. 8A in relative detail, according to an example embodiment.

Those of ordinary skill in the relevant art may readily appreciate that the elongated perforated tube assemblies 627, 627f, 627p, 627s may be made of rigid or flexible material, as an example and not to be limiting, such as plastic, and may be coated or not with a non-stick coating known in the art. As long as the composition may be efficiently pumped therethrough via the pump system 135. Those of ordinary skill in the relevant art may also readily appreciate that the amount, size and spacing of the perforations of the elongated perforated tube assemblies 627, 627f, 627p, 627s may vary, dependent upon the ceramic particle sizes, viscosity of the composition, specification of the pump system 135, and shape of the bottom of the vat 120. FIG. 8A is a schematic perspective second side view of a plurality of elongated perforated tubes in relative detail, according to an example embodiment. FIG. 8B is a plane bottom side view of the plurality of elongated perforated tubes assembly FIG. 8A in relative detail, according to an example embodiment. Referring to FIGS. 8A and 8B, and referring to FIG. 6C, a plurality of elongated perforated tubes assembly 827p comprises three elongated sections having two rows of evenly spaced perforations P each. In some embodiments, the two rows of evenly spaced perforations P are determined based on a 45° degree angle opposite the bottom plane surface of, as an example, the vat 120, when the plurality of elongated perforated tubes assembly is flatly disposed. The 45° degree angle originates from a centerline of each respective elongated perforated tube, and is perpendicular to the centerline and evenly spaced apart. The 45° degree angle of the two rows of evenly spaced perforations P, maximize the efficiency of composition intake of agglomerated ceramic particles into the density control reservoir 140 from the bottom of the vat 120.

Figure 9:
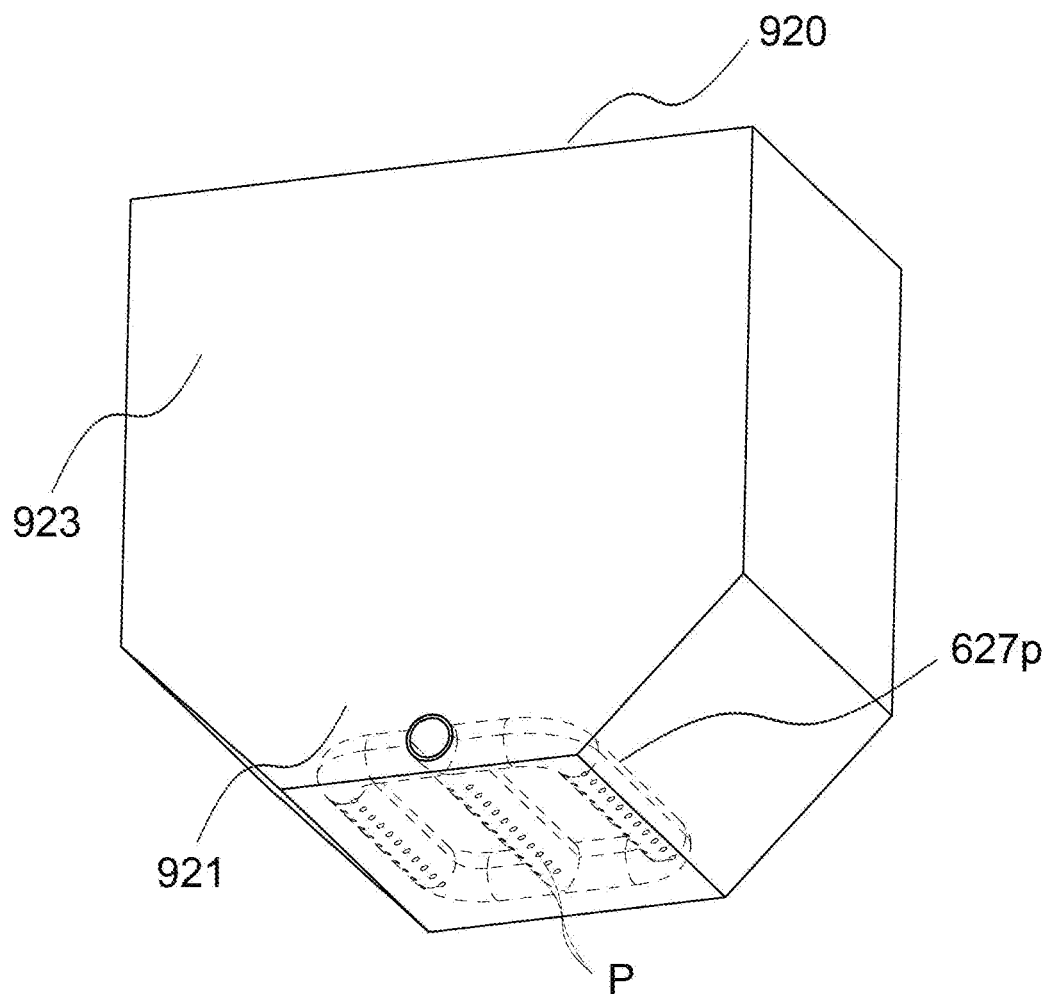
FIG. 9 is a schematic perspective back side view of a vat having the plurality of elongated perforated tubes assembly of FIG. 8A in relative detail, according to an example embodiment.

In some embodiments, the bottom of the vat 120 of the vat assembly 110 is flat; however, the embodiments are not limited thereto. The bottom of the vat 120 may be funnel-shaped or a combination of being flat and funnel-shaped. FIG. 9 is a schematic perspective back side view of a vat having the plurality of elongated perforated tubes assembly of FIG. 7A in relative detail, according to an example embodiment. Referring to FIG. 9, and referring to FIGS. 1 to 5 and FIGS. 6C to 8B, the bottom level 921 of the vat 920 is partially funnel-shaped having a flat bottom. The partial funnel-shape of the vat 920 expedites the ceramic particles to agglomerate within an area of the vat 920 that is smaller than an opening level 923 thereof. Thus, the plurality of elongated perforated tubes assembly 627p may more efficiently and effectively intake agglomerated ceramic particles into the density control reservoir 140 from the bottom of the vat 920. Also, the flat bottom of the vat 920 accommodates the elevatable assembly 160 of the build system 180 of the AM assembly when in operation. Those of ordinary skill in the relevant art may readily appreciate that other variations of the bottom level of the vat may be employed in the embodiments, as long as the vat may be secured flush with at least a portion of the plurality of first, second and third shelves, respectively, to fix and support the vat and mitigate movement thereof, the vat may be outwardly moved from a secure and unmovable position, via a plurality of wheels or moveable platform, to an outer position for maintenance, parts replacement or filling of the vat, and the flat bottom of the vat may accommodate the elevatable assembly of the build system.

In some embodiments, the pumping of the vat composition from the bottom and opening levels 121, 126 ensures that two different composition ceramic particle densities are mixed together via confluence when entering the density control reservoir 140. In some embodiments, the density control reservoir 140 accounts for confluence mixing of the two different composition ceramic particle densities; however, the embodiments are not limited thereto. Those of ordinary skill in the art may readily appreciate that the density control reservoir 140 may comprise additional functions of the AM system 100 dependent on application-specific requirements such as viscosity control and volume adjustment of the composition in the vat 120, respectively, as examples, and not to be limiting.

Figure 10A:
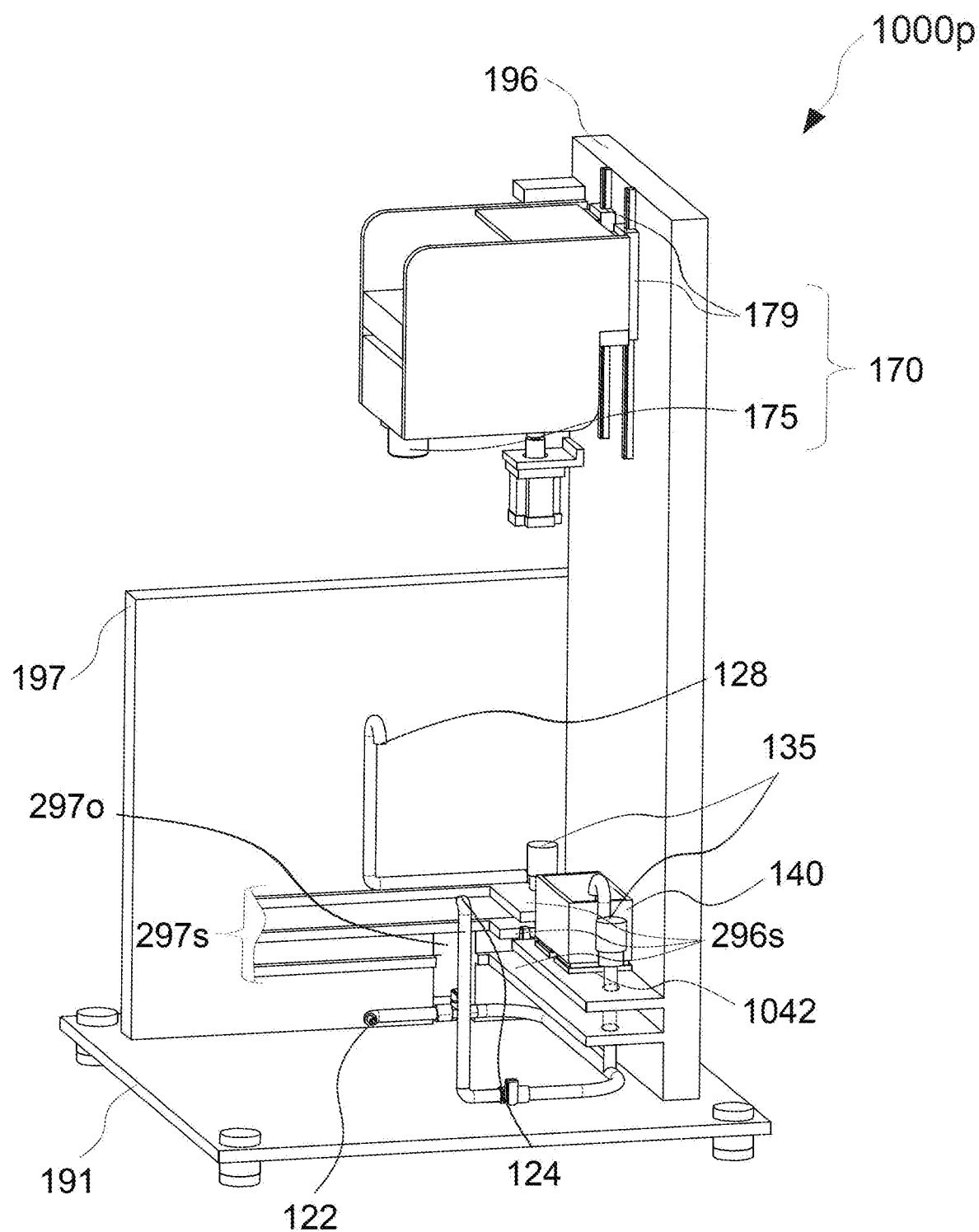
FIG. 10A is a schematic perspective first side view of a portion of the additive manufacturing (AM) system of FIG. 1, having a heating mechanism attached to the density control reservoir, according to an example embodiment.

FIG. 10A is a schematic perspective first side view of a portion of the additive manufacturing (AM) system of FIG. 1, having a heating mechanism attached to the density control reservoir, according to an example embodiment. In some embodiments, referring to FIG. 10A, and referring to FIGS. 1 to 6, the density control reservoir 140 comprises a heating mechanism 1042 attached to a bottom thereof. In some embodiments, the heating mechanism 1042 is a heating pad, whereby the bottom of the density control reservoir 140 is employed as a heat transfer medium to transfer heat thereto; however the embodiments are not limited thereto. Those skilled in the relevant art may readily appreciate that any type of indirect heat transfer systems, as an example, and not to be limiting, such as an outer jacket or coil heat transfer system, employed to heat the density control reservoir 140 to a desired temperature. The heating mechanism 1042 is employed as a means to adjust the physical properties (e.g., viscosity etc.) of the composition and/or fabrication conditions, by heating or non-heating thereof.

Figure 10B:
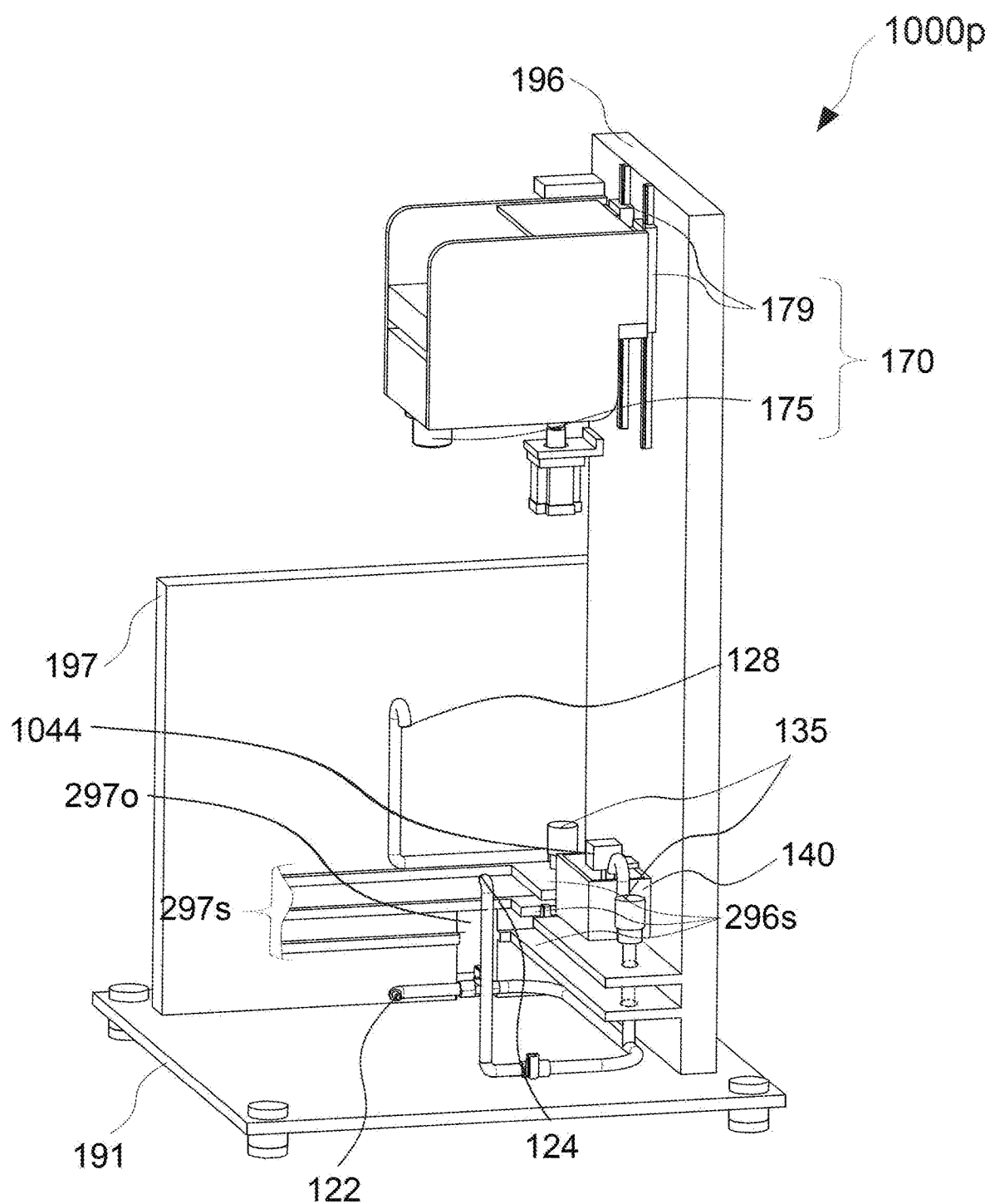
FIG. 10B is a schematic perspective first side view of a portion of the additive manufacturing (AM) system of FIG. 1, having a mixing mechanism attached to the density control reservoir, according to an example embodiment.

FIG. 10B is a schematic perspective first side view of a portion of the additive manufacturing (AM) system of FIG. 1, having a mixing mechanism attached to the density control reservoir, according to an example embodiment. In some embodiments, referring to FIG. 10B, and referring to FIGS. 1 to 6, the density control reservoir 140 comprises a mixing mechanism 1044 attached to a top thereof. In some embodiments, the mixing mechanism 1044 is an electric geared motor driven mixing mechanism 1044 having a shaft and an impeller, whereby the horse power of the motor and size and shape of the blades of the impeller depend on the predetermined viscosity of the composition. Those skilled in the relevant art may readily appreciate that any type of mixing mechanism may be employed to further mix the two different composition ceramic particle densities in the density control reservoir 140 to a desired homogenous level and the embodiments are not limited.

Figure 10C:
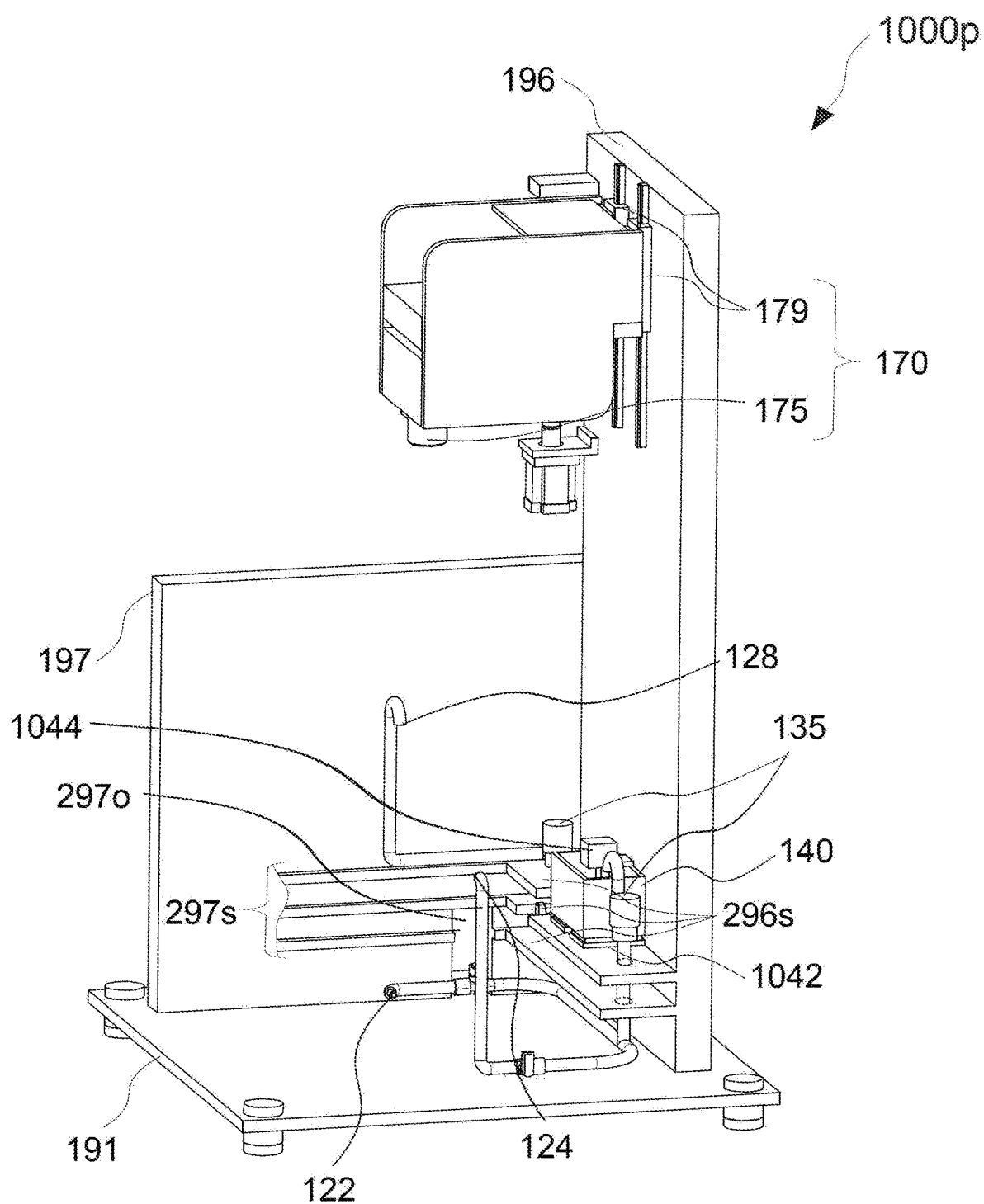
FIG. 10C is a schematic perspective first side view of a portion of the additive manufacturing (AM) system of FIG. 1, having a heating mechanism and mixing mechanism attached to the density control reservoir, according to an example embodiment.
Figure 10D:
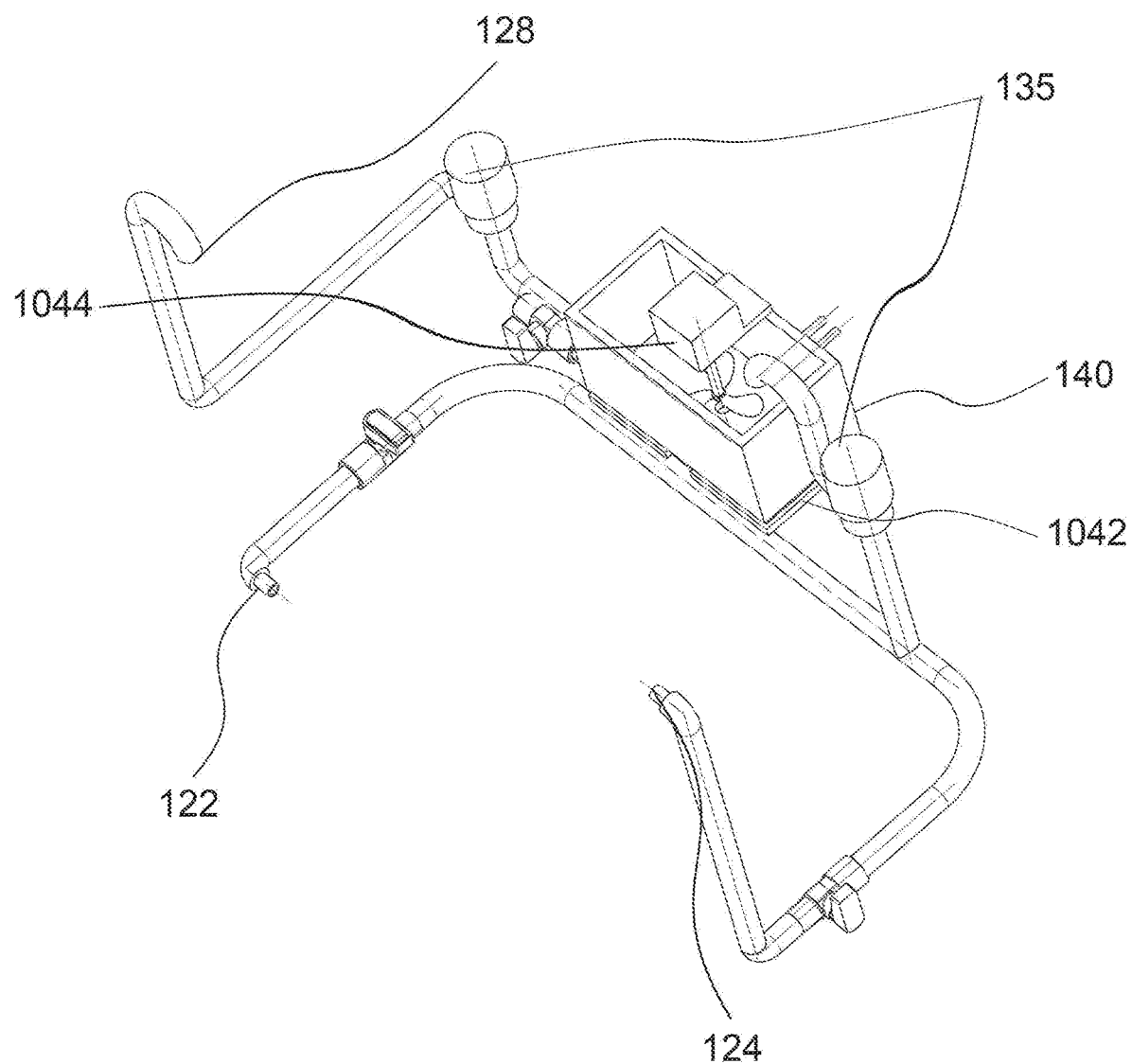
FIG. 10D is a schematic perspective top side view of the density control reservoir of FIG. 1 in relative detail, having a heating mechanism and mixing mechanism attached to the density control reservoir, according to an example embodiment.

In some embodiments, the AM system 100 comprises both a heating mechanism 1042 and a mixing mechanism 1044 attached to the density control reservoir. FIG. 10C is a schematic perspective first side view of a portion of the additive manufacturing (AM) system of FIG. 1, having a heating mechanism and mixing mechanism attached to the density control reservoir, according to an example embodiment. FIG. 10D is a schematic perspective top side view of the density control reservoir of FIG. 1 in relative detail, having a heating mechanism and mixing mechanism attached to the density control reservoir, according to an example embodiment. The heating mechanism 1044 and mixing mechanism 1044 may be employed as a means to adjust the viscosity and homogenous level of the composition at the same time.

In some embodiments, the material of the density control reservoir 140 and the shaft and impeller of the mixing mechanism 1044 may be made of a non-stick metal, as an example, and not to be limiting, such as stainless steel or powder coated steel.

Figure 11:
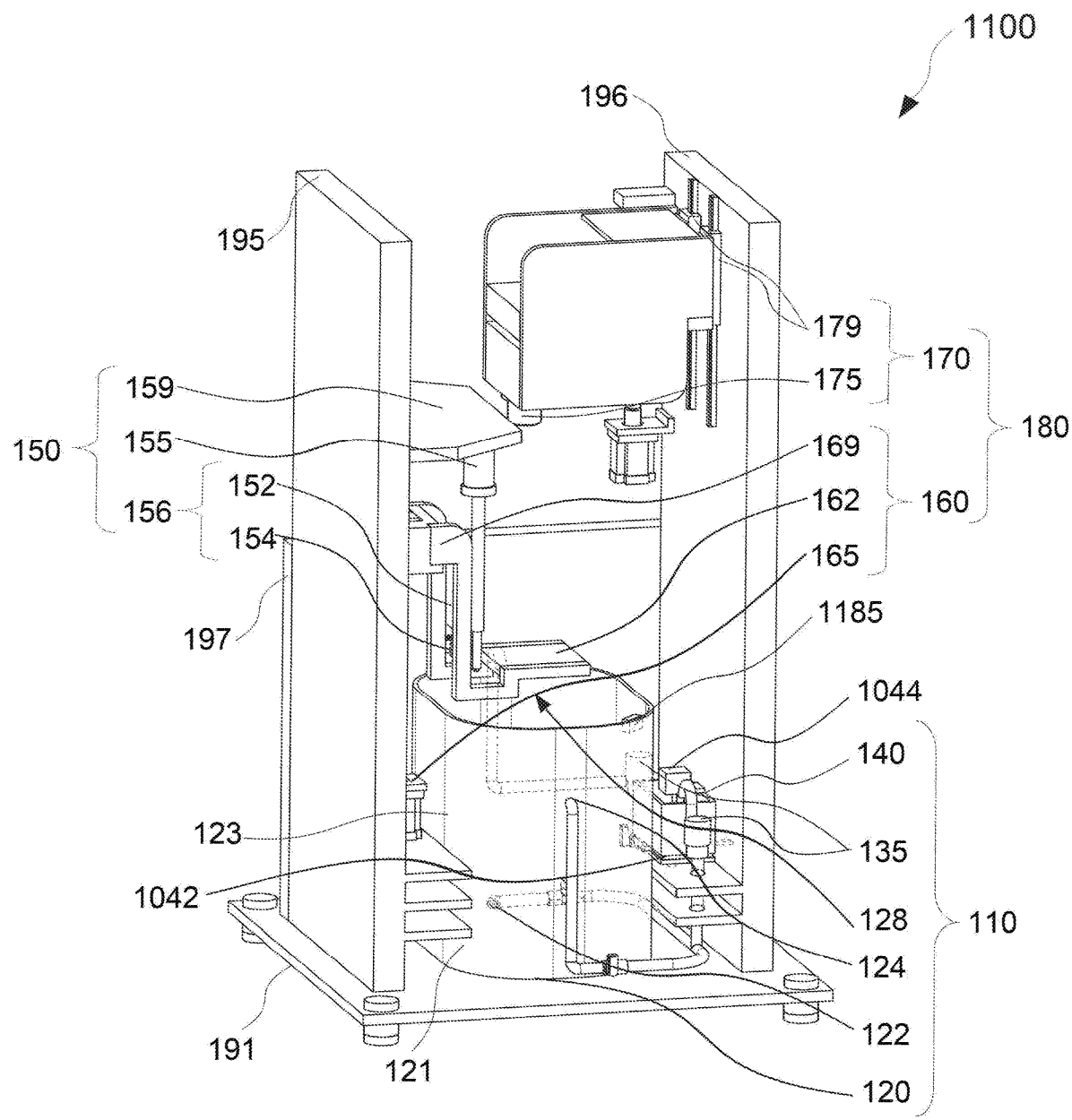
FIG. 11 is a schematic perspective first side view of an additive manufacturing (AM) system of FIG. 1, having a heating mechanism and mixing mechanism attached to the density control reservoir and a displacement sensor attached to the vat, according to an example embodiment.

In some embodiments, the pump system 135, periodically pumps the composition in the vat 120 from the first fluid outlet 122 at the bottom level 121 of the vat 120 and second fluid outlet 124 at the opening level 123 of the vat 120 to the density control reservoir 140 and then back into the vat 120 via the inlet conduit 128, ensuring that two different composition ceramic particle densities are mixed together via confluence. A continuous homogeneous and effective distribution of the ceramic particles in the composition throughout the AM system 100 shaping process is achieved; however, the embodiments are not limited thereto. FIG. 11 is a schematic perspective first side view of an additive manufacturing (AM) system of FIG. 1, having a heating mechanism and mixing mechanism attached to the density control reservoir and a displacement sensor attached to the vat, according to an example embodiment. In some embodiments, referring to FIG. 11, and referring to FIGS. 1 to 7 and 9, the density control reservoir 140 comprises a displacement sensor 185 attached to the vat 120. In some embodiments, the displacement sensor 1185 is a laser displacement sensor, whereby triangulation is applied by combining the displacement sensor 1185 with a position sensitive device (PSD) to perform ranging (detecting the amount of displacement). Those skilled in the relevant art may readily appreciate that any type of laser displacement sensor or like system of determining the level of the composition in the vat 120 may be employed and the embodiments are not limited.

Figure 12:
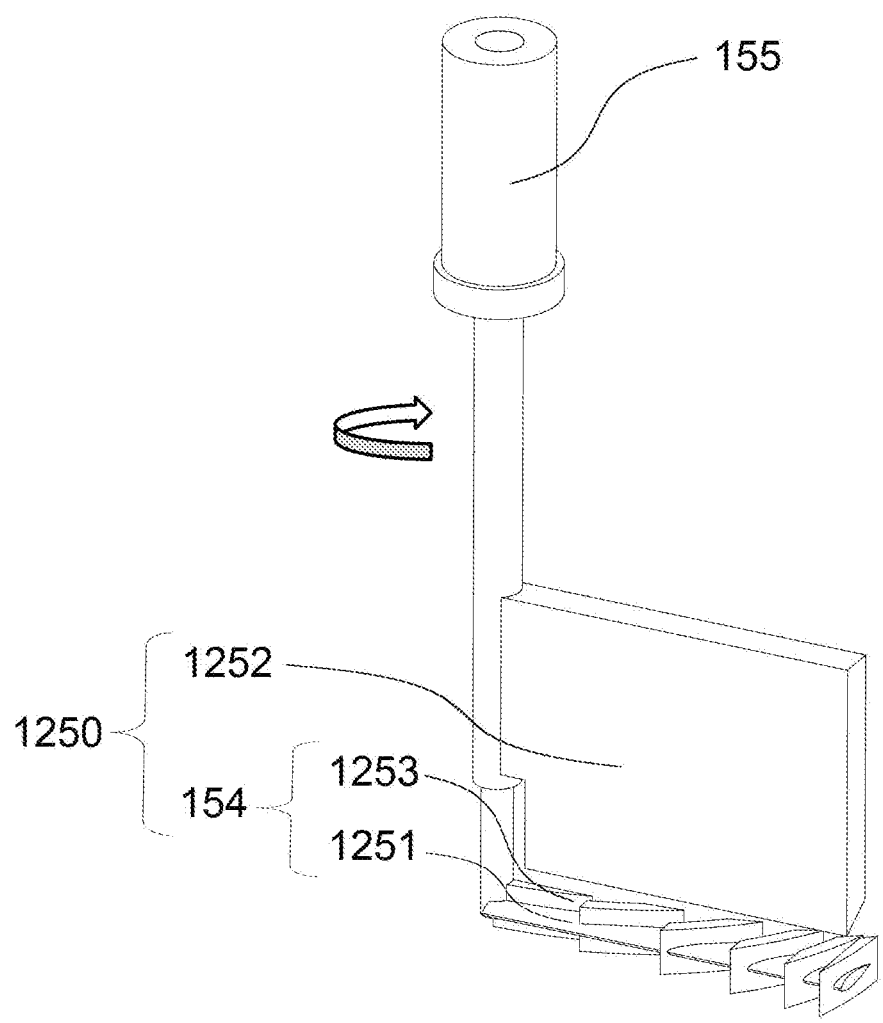
FIG. 12 is a schematic perspective front side view of an alternative dispersing blade and a cutting blade of a blade system of an additive manufacturing (AM) system in relative detail, according to an example embodiment.

The AM assembly comprising the blade system 150 is operatively associated with the vat assembly 110 and AM assembly, dispersing and cutting a top level and top surface, respectively, of the composition in the vat 120 of the vat assembly. FIG. 12 is a schematic perspective front side view of an alternative dispersing blade and a cutting blade of a blade system of an additive manufacturing (AM) system in relative detail, according to an example embodiment. Referring to FIG. 12, and referring to FIGS. 1, 2A, 3 to 5, and 11, in some embodiments, the blade system 1250 comprises a blade system support 159, a blade system motor 155, a dispersing blade 154 and a cutting blade 1252, disposed above the dispersing blade 154. The blade system motor 155 is secured to the blade system support 159 which protrudes outward from the first supporting wall 195 toward a center of the AM system 100, to operate the dispersing blade 154 and cutting blade 1252. In some embodiments, the dispersing blade 154 and cutting blade 1252 are connected to two separate shafts on near ends thereof, respectively, whereby the diameter of the dispersing blade 154 shaft is smaller than the diameter of the cutting blade 1252 shaft and rotatably fits therein. In some embodiments, the dispersing blade 154 and cutting blade 1252 pivot and move back-and-forth in a semi-arc motion and in a z-direction, concurrently, independently or any combination thereof. In some embodiments, the viewable length of the shaft of the dispersing blade 154 decreases and increases, as the shaft moves into and out of the interior of the shaft of the cutting blade 1252. In some embodiments, the viewable length of the shaft of the cutting blade 1252 decreases and increases, as the shaft moves into and out of the interior of the shaft of the blade system motor 155.

In some embodiments, the operation of the dispersing blade 154 and cutting blade 1252 comprises first, both the dispersing blade 154 and cutting blade 1252 moving downward together to an immersed start position of the dispersing blade 154 and a start position of the cutting blade 1252. The immersed start position of the dispersing blade 154 means that the dispersing blade 154 and a portion of the dispersing blade shaft are completely immersed in the composition of the vat 120. The start position of the cutting blade 1252 means that the bottom of the cutting blade 1252 closest to the composition of the vat 120 is completely not in contact with the composition of the vat 120. Following the pumping of composition from the density control reservoir 140 to the inlet conduit 128 and into the vat 120 near to the dispersing blade 154, the dispersing blade 154 moves from the immersed start position to an immersed end position, opposite the immersed start position, dispersing a top level of the composition in the vat 120 without breaking the top surface of the composition and without generating bubbles in the composition. Following, the cutting blade 1252 moves downward from the start position to a downward ready position. The downward ready position is a position where the bottom of the cutting blade 1252 closest to the composition of the vat 120 is in contact with a top surface of the composition. Next, the cutting blade 1252 moves from the downward ready position, and cuts a surface area of the composition where irradiation is to be performed, to an end position, opposite the start position, whereby the cutting blade 1252 is once again in line with the dispersing blade 154. Following irradiation, the cutting blade 1252 moves from the end position to an upward completion position, whereby the upward completion position is a position where the bottom of the cutting blade 1252 closest to the composition of the vat 120 is completely not in contact with the composition of the vat 120. Lastly, both the dispersing blade 154 and cutting blade 1252 move back to their original positions, the immersed start position and start position, respectively, before starting the operation once again. Those of ordinary skill in the related art may readily appreciate that the operation steps of dispersing blade 154 and cutting blade 1252 may be varied or additional steps may be added or steps may be subtracted and the embodiments are not limited thereto. As long as the dispersing blade 154 is able to disperse the composition pumped into the vat 120, from an area near to the inlet conduit 128, toward and throughout a central top level of the composition where irradiation is to be performed and thereafter, the cutting blade 1252 is able to cut a surface area of the composition where irradiation is to be performed.

Figures 13A, 13B, 13C:
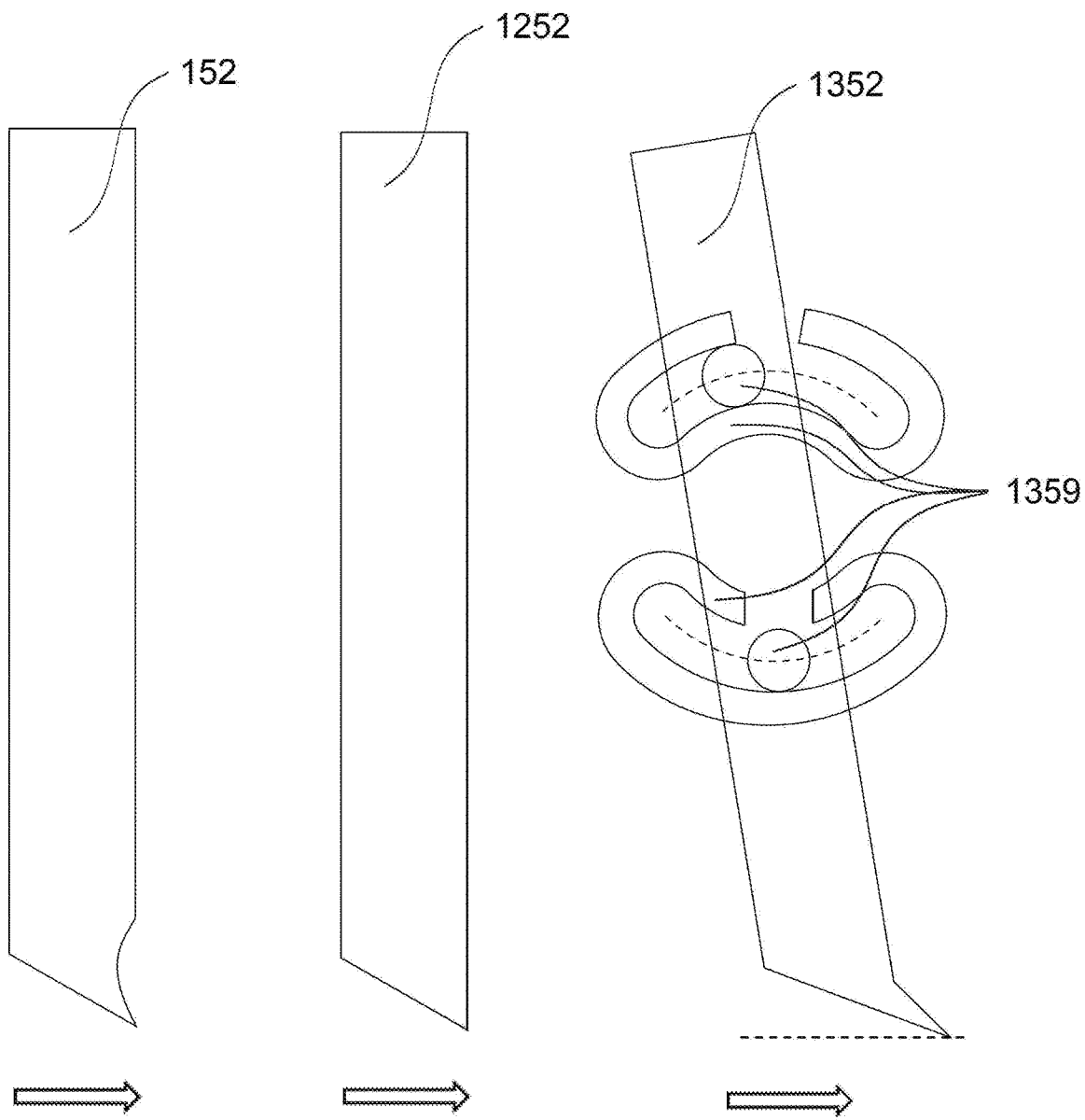
FIG. 13A is a schematic perspective side view of the cutting blade of the additive manufacturing (AM) system of FIG. 1 in relative detail, according to an example embodiment.
FIG. 13B is a schematic perspective side view of the cutting blade of the blade system of the additive manufacturing (AM) system of FIG. 12 in relative detail, according to an example embodiment.
FIG. 13C is a schematic perspective side view of another alternative cutting blade of a blade system of an additive manufacturing (AM) system in relative detail, according to an example embodiment.

Those of ordinary skill in the related art may readily appreciate that the shape of the cutting blade 1252 is not limited to the embodiments, and in addition to being interchangeable, other blade shapes and/or sizes may be employed in the embodiments, as long as the cutting blade 1252 is able to cut a surface area of the composition where irradiation is to be performed. Generally, in some embodiments, an angle of a plane of a front face of the cutting blade in the direction of cutting from a side view, to a plane of the composition in the vat 120 of the direction to be cut, is at least 90° degrees or greater; however, the embodiments are not limited thereto, and the angle may be adjusted dependent upon application-specific requirements. Generally, in some embodiments, from a side view, an angle of the cutting blade from a point which may be in contact with the composition of the vat 120, from a side view, to a plane of the composition in the vat 120 of the direction that is not cut, is at least 30° degrees or greater; however, the embodiments are not limited thereto, and the angle may be adjusted dependent upon application-specific requirements. FIG. 13A is a schematic perspective side view of the cutting blade of the additive manufacturing (AM) system of FIG. 1 in relative detail, according to an example embodiment. FIG. 13B is a schematic perspective side view of the cutting blade of the blade system of the additive manufacturing (AM) system of FIG. 12 in relative detail, according to an example embodiment. FIG. 13C is a schematic perspective side view of another alternative cutting blade of a blade system of an additive manufacturing (AM) system in relative detail, according to an example embodiment. Referring to FIGS. 13A to 13C, and referring to FIGS. 1, 2A, 3 to 5, 11, and 12, the bottom of the cutting blade 1252 may be varied depending upon the physical properties (e.g., viscosity etc.) of the composition in the vat 120 and/or fabrication conditions. As an example, and not to be limiting, the bottom of the cutting blade 152, 1252 may be curved or straight, respectively. In another alternative embodiment, the bottom of the cutting blade 1352 is thinner on a cutting edge direction thereof and the cutting blade 1352 comprises a rotatable mechanism 1359 allowing for rotation and fixing thereof. The rotatable mechanism 1359 allows the cutting blade 1352 to be rotated and fixed, whereby a bottom point thereof which may be in contact with the composition of the vat 120 for cutting, from a side view, does not move up-or-down in a z-direction when rotated. Different cutting angle faces of the cutting blade 1352 may be employed for different composition viscosities without having to manually change the cutting blade 1352. Thus, one cutting blade 1352 may provide the same functions of numerous cutting blades. Additionally, a point which may be in contact with the composition of the vat 120, from a side view, of the cutting blade 1352, is extended and narrowed, such that an angle of a plane of a front face of the cutting blade in the direction of cutting from a side view, to a plane of the composition in the vat 120 of the direction to be cut, is at least 90° degrees or greater, and an angle of the cutting blade from a point which may be in contact with the composition of the vat 120, from a side view, to a plane of the composition in the vat 120 of the direction that is not cut, is at least 30° degrees or greater.

Figure 14A:
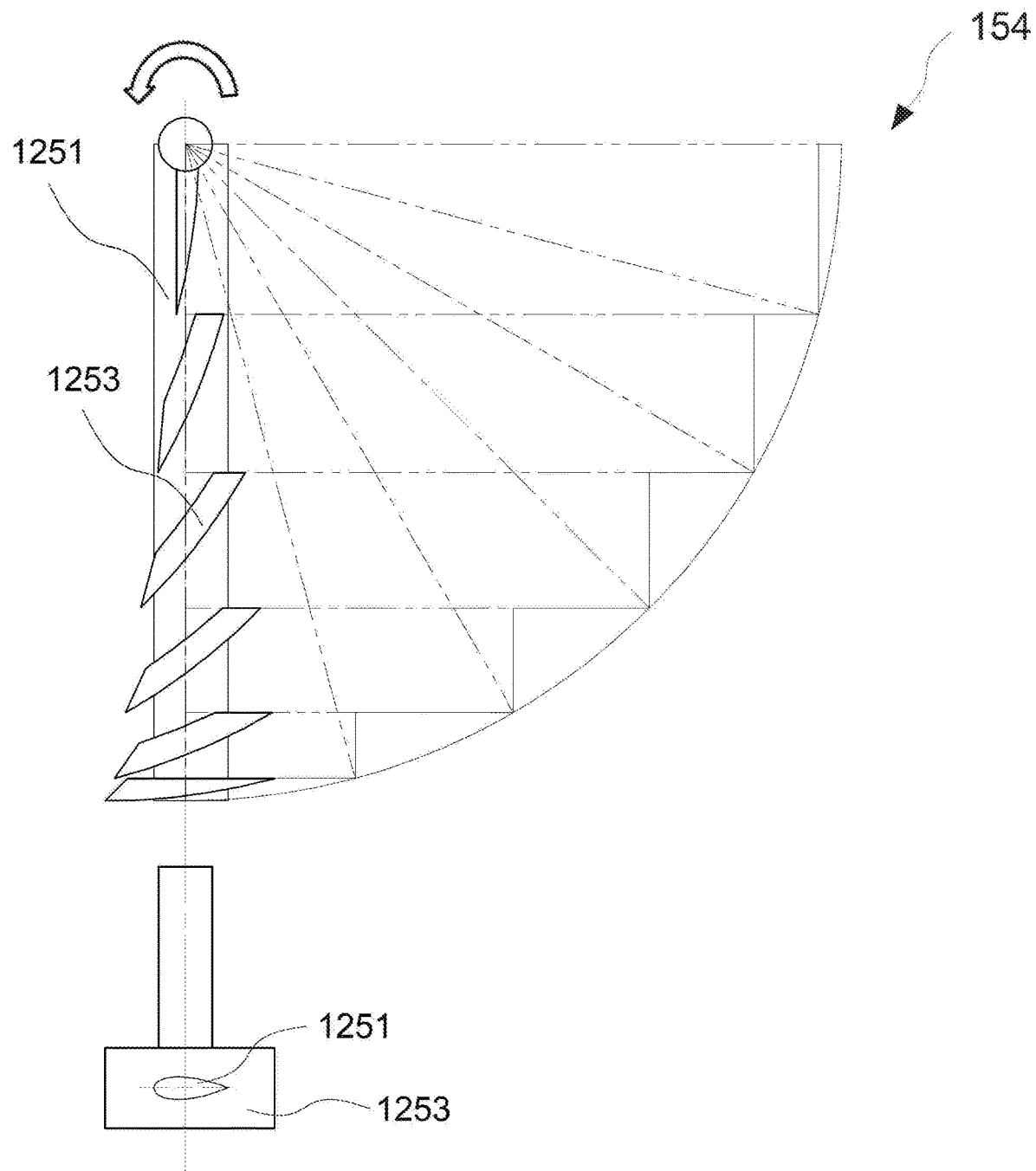
FIG. 14A is a schematic perspective top side and side view of the dispersing blade of the blade system of the additive manufacturing (AM) system of FIG. 1 in relative detail, according to an example embodiment.
Figure 14B:
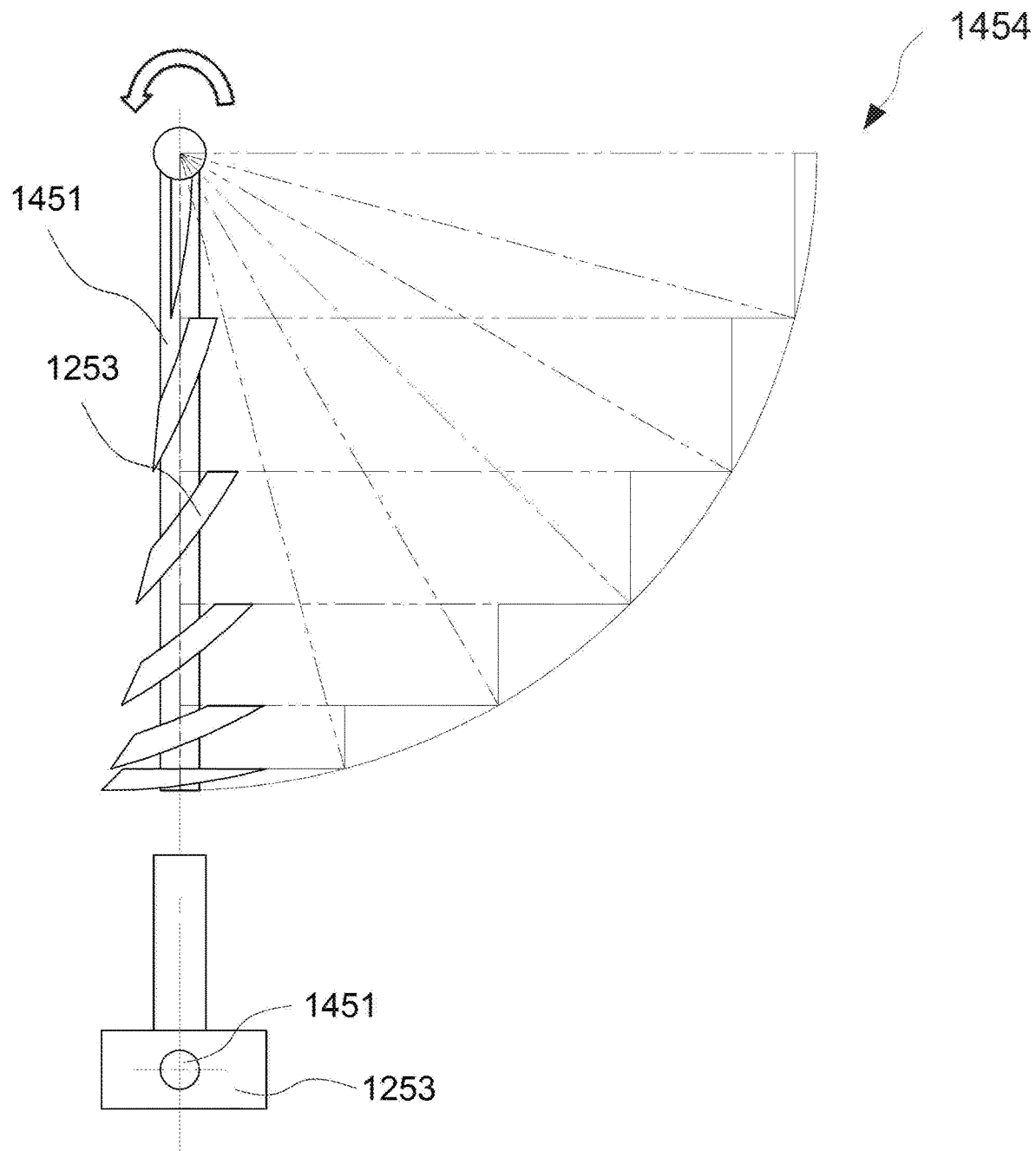
FIG. 14B is a schematic perspective top side view and side view of an alternative dispersing blade of a blade system of an additive manufacturing (AM) system in relative detail, according to an example embodiment.

In some embodiments, the dispersing blade 154 disperses the composition from near to the inlet conduit 128 toward and throughout a central top level of the composition where irradiation is to be performed, without breaking the surface of the composition and without generating bubbles, via a plurality of dispersing blades. FIG. 14A is a schematic perspective top side and side view of the dispersing blade of the blade system of the additive manufacturing (AM) system of FIG. 1 in relative detail, according to an example embodiment. FIG. 14B is a schematic perspective top side view and side view of an alternative dispersing blade of a blade system of an additive manufacturing (AM) system in relative detail, according to an example embodiment. Referring to FIGS. 14A and 14B, and referring to FIGS. 1, 2A, 3 to 5, 11, and 12, the dispersing blade 154 comprises a plurality of dispersing blades 1253 and a central support 1251, whereby the plurality of dispersing blades 1253 are centrally connected via the central support 1251. In some embodiments, the shape of the central support 1251 from a side-view is tear-shaped, whereby the pointed end of the tear is toward the dispersing direction of composition; however, the embodiments are not limited thereto. In an alternative embodiment, the shape of the central support 1451 from a side-view is circular-shaped. Those of ordinary skill in the relevant art may readily appreciate that other shapes and attachment positions may be employed for the central support 1251, 1451 of the embodiments, as long as turbulence in the composition in the vat 120 is minimized during movement of the central support 1251, 1451, by the movement of the central support 1251, 1451 during operation, and for example, and not to be limiting, and lag of the far end of the central support 1251 opposite the pivotable near end attached to the shaft of the blade system 150 is minimized. In some embodiments, the general angle of the plurality of dispersing blades 1253 centrally connected via the central support 1251, 1451, directly corresponds to portions of an arc of a length of the central support 1251, 1451, formed from an end thereof. Those of ordinary skill in the relevant art may readily appreciate that the amount, width, length, height and design of the plurality of dispersing blades 1253 may be varied dependent upon application-specific requirements, and the embodiments are not limited. As long as the plurality of dispersing blades 1253 may efficiently disperse the composition from near to the inlet conduit 128 toward and throughout a central top level of the composition where irradiation is to be performed, without breaking the surface of the composition and without generating bubbles.

Figure 15:
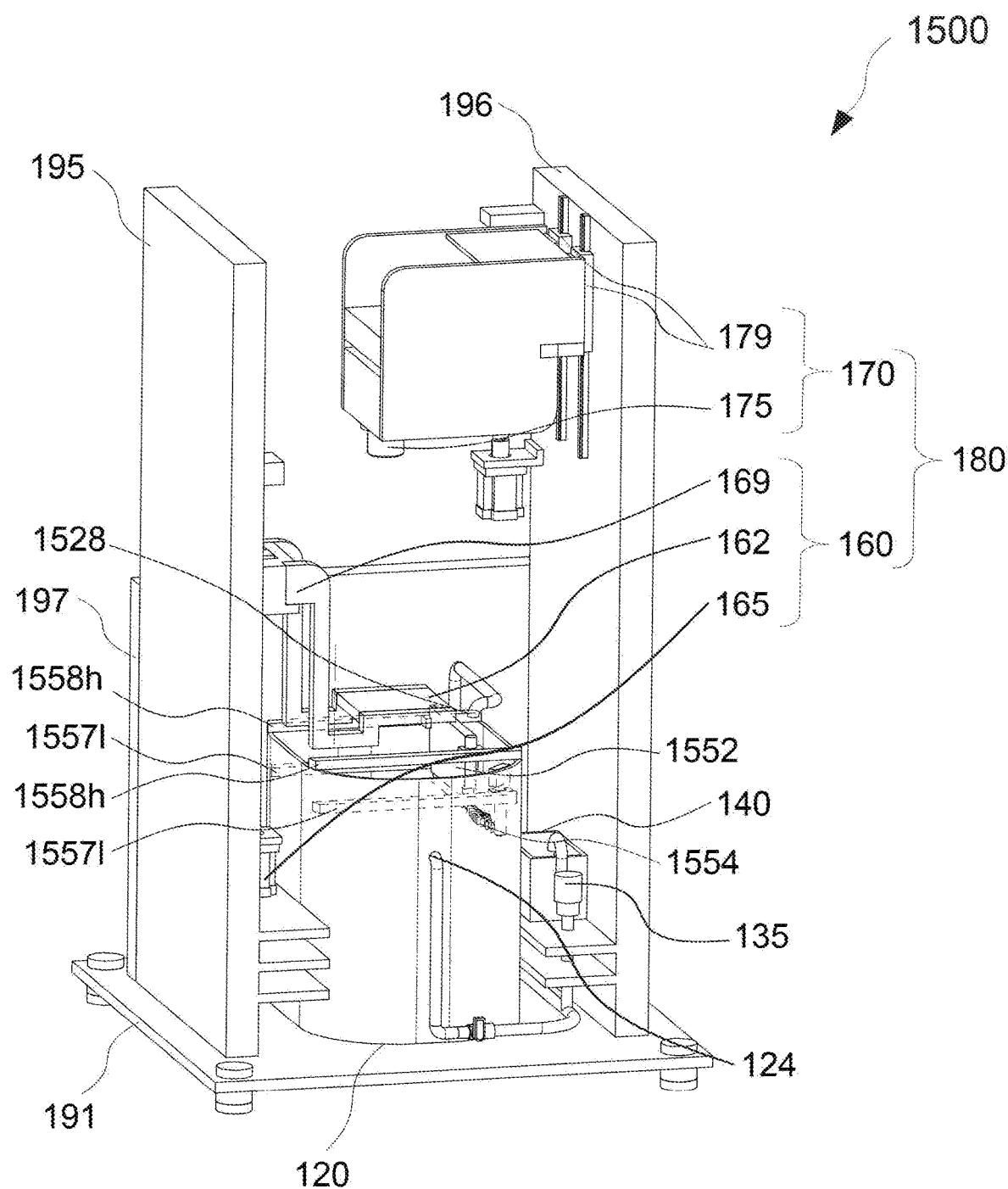
FIG. 15 is a schematic perspective first side view of an additive manufacturing (AM) system having an alternative blade system, according to an example embodiment.
Figure 16:
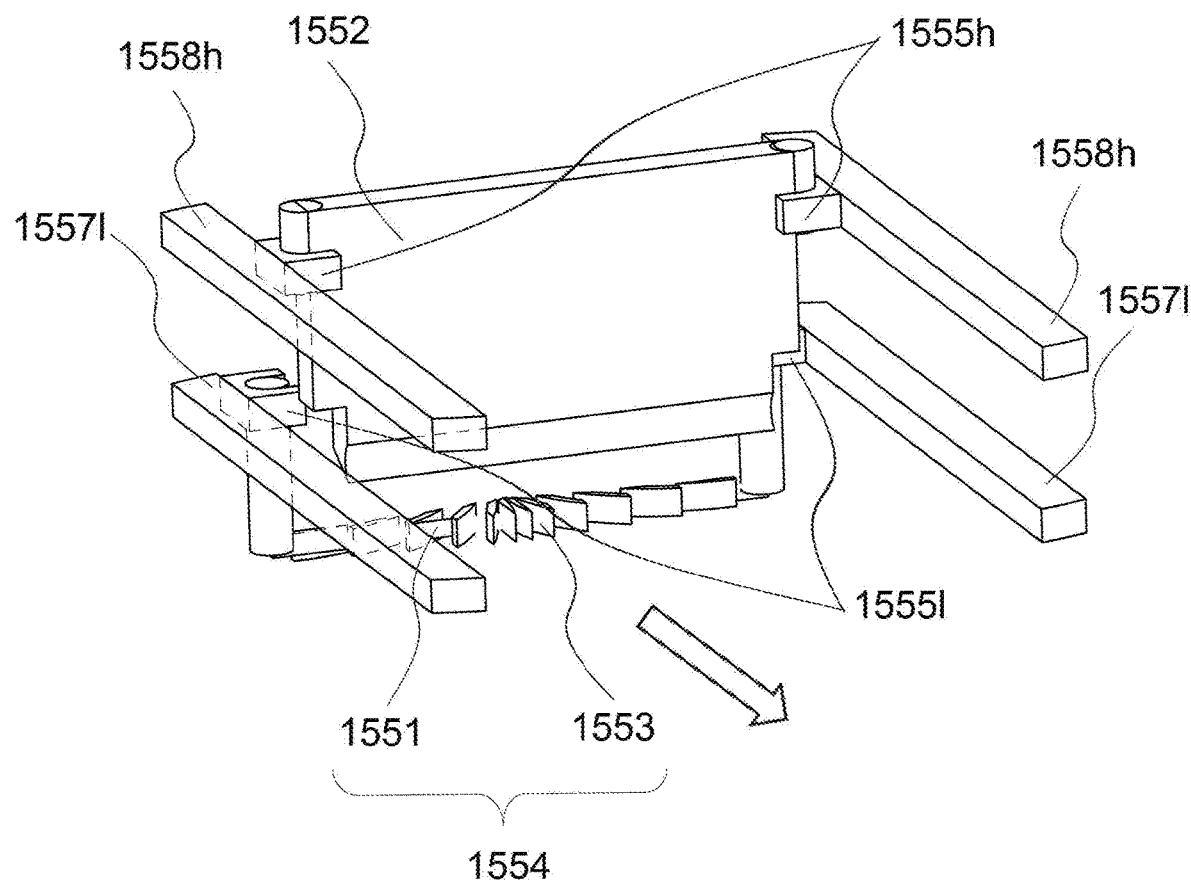
FIG. 16 is a schematic perspective first side view of the alternative blade system of the additive manufacturing (AM) system FIG. 15 in relative detail, according to an example embodiment.
Figure 17:
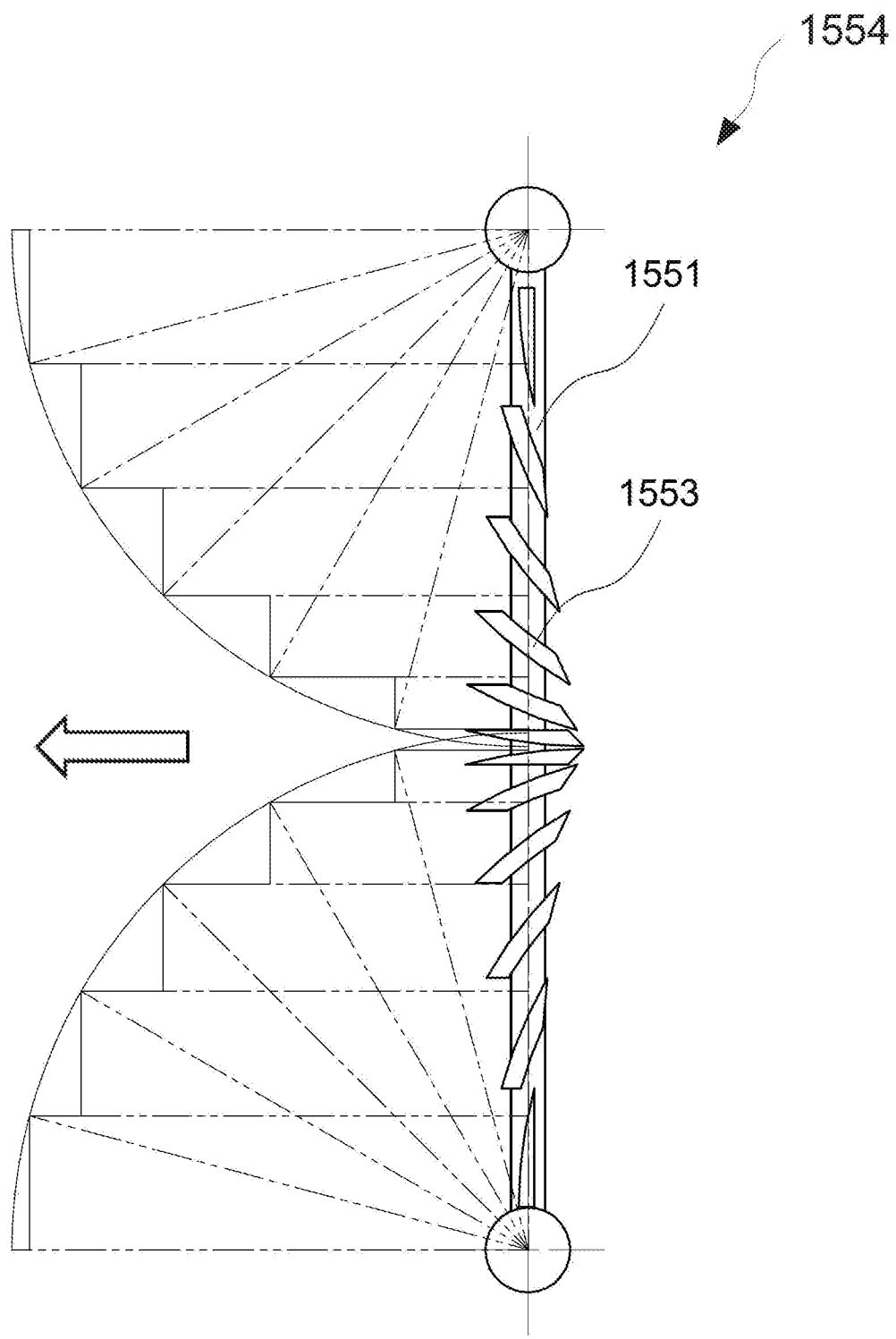
FIG. 17 is a schematic perspective top side view of the alternative dispersing blade of the alternative blade system FIG. 16 in relative detail, according to an example embodiment.

In some embodiments, the dispersing blade and cutting blade are connected to two separate shafts on near ends thereof, pivoting and moving back-and-forth in a semi-arc motion and in a z-direction, concurrently, independently or any combination thereof; however, the embodiments are not limited thereto. FIG. 15 is a schematic perspective first side view of an additive manufacturing (AM) system having an alternative blade system, according to an example embodiment. FIG. 16 is a schematic perspective first side view of the alternative blade system of the additive manufacturing (AM) system FIG. 15 in relative detail, according to an example embodiment. FIG. 17 is a schematic perspective top side view of the alternative dispersing blade of the alternative blade system FIG. 16 in relative detail, according to an example embodiment. Referring to FIGS. 15 to 17, and referring to FIGS. 1, 2A, 3 to 5, 11, and 15, in some embodiments, the blade system 1550 comprises a dispersing blade 1554, disposed below a cutting blade 1552, two opposing dispersing blade support railings 15571, disposed below two opposing cutting blade support railings 1558h, two opposing dispersing blade motors 15551, moveably attached in a longitudinal direction to the two opposing dispersing blade support railings 15571, and two opposing cutting blade motors 1555h, moveably attached in a longitudinal- and z-direction to the two opposing cutting blade support railings 1558h. In some embodiments, the two opposing dispersing blade support railings 15571 are immersed in the composition of the vat 120 and disposed along a front and back opening level walls of the vat 120, and the two opposing cutting blade support railings 1558h are secured to top front and back edges of the vat 120. The dispersing blade 1554 is secured on both ends to the two opposing dispersing blade motors 15551 and the cutting blade 1552 is secured on both ends to the two opposing cutting blade motors 1555h. In some embodiments the two opposing dispersing blade support railings 15571 and two opposing cutting blade support railings 1558h are aligned longitudinally, along front and back walls of the vat 120, perpendicular to the first supporting wall 195. In some embodiments, the dispersing blade 1554 and cutting blade 1552 move back-and-forth in a longitudinal direction, and longitudinal- and z-direction, respectively, concurrently, independently or any combination thereof.

In some embodiments, the operation of the dispersing blade 1554 and cutting blade 1552 comprises first, the dispersing blade 1554 set at an immersed start position, and the cutting blade 1552 moving downward to a start position. The immersed start position of the dispersing blade 1554 means that the dispersing blade 1554 is completely immersed in the composition of the vat 120. The start position of the cutting blade 1552 means that the bottom of the cutting blade 1552 closest to the composition of the vat 120 is completely not in contact with the composition of the vat 120. Following the pumping of composition from the density control reservoir 140 to the inlet conduit 1528 and into the vat 120 near to the dispersing blade 1554, the dispersing blade 1554 moves from the immersed start position to an immersed end position, opposite the immersed start position, dispersing a top level of the composition in the vat 120 without breaking the top surface of the composition and without generating bubbles in the composition. Following, the cutting blade 1552 moves downward from the start position to a downward ready position. The downward ready position is a position where the bottom of the cutting blade 1552 closest to the composition of the vat 120 is in contact with a top surface of the composition. Next, the cutting blade 1552 moves from the downward ready position, and cuts a surface area of the composition where irradiation is to be performed, to an end position, opposite the start position, whereby the cutting blade 1552 is once again in line with the dispersing blade 154. Following irradiation, the cutting blade 1552 moves from the end position to an upward completion position, whereby the upward completion position is a position where the bottom of the cutting blade 1552 closest to the composition of the vat 120 is not in contact with the composition of the vat 120. Lastly, both the dispersing blade 1554 and cutting blade 1552 move back to their original positions, the immersed start position and start position, respectively, before starting the operation once again. Those of ordinary skill in the related art may readily appreciate that the operation steps of dispersing blade 1554 and cutting blade 1552 may be varied or additional steps may be added or steps may be subtracted and the embodiments are not limited thereto. As long as the dispersing blade 1554 is able to disperse the composition pumped into the vat 120, from an area near to the inlet conduit 1528, toward and throughout a central top level of the composition where irradiation is to be performed and thereafter, the cutting blade 1552 is able to cut a surface area of the composition where irradiation is to be performed. Generally, the embodiments of the dispersing blades and cutting blades of the blade system 150 may be employed with the dispersing blade 1554 and cutting blade 1552 of the blade system 1550 following design adjustments.

Referring to FIGS. 15 to 17, and referring to FIGS. 1, 2A, 3 to 5, and 11, the dispersing blade 1554 comprises a plurality of dispersing blades 1553 and a central support 1551, whereby the plurality of dispersing blades 1553 are centrally connected via the central support 1551. Generally, the embodiments of the shapes of the central support for the dispersing blades of the blade system 150 may be employed with the dispersing blade 1554 of the blade system 1550 following design adjustments. In some embodiments, the general angle of the plurality of dispersing blades 1553 centrally connected via the central support 1551, directly corresponds to portions of two half-length arcs of the central support 1551, starting from a central point, arching outward. Those of ordinary skill in the relevant art may readily appreciate that the amount, width, length, height and design of the plurality of dispersing blades 1553 may be varied dependent upon application-specific requirements, and the embodiments are not limited. As long as the plurality of dispersing blades 1553 may efficiently disperse the composition from near to the inlet conduit 1528 toward and throughout a central top level of the composition where irradiation is to be performed, without breaking the surface of the composition and without generating bubbles.

In some embodiments, the build system 180 having the elevatable assembly 160 and an energy source delivery system 170, operatively associated with the vat assembly 110, performs the AM irradiation method employing the composition. The elevatable assembly 160 comprises a removable build platform 162, a build support arm mechanism 169, and a build motor system 165. In some embodiments, the removable build platform 162 is disposed on a U-shaped elevated end of the build support arm mechanism 169. The build support arm mechanism 169 is moveably attached to the build motor system 165 at an opposite end of the U-shaped elevated end having the removable build platform 162 thereon. The build support mechanism 169 moves in an upward and downward z-direction via the build motor system 165 which is elevatable and operatively associated therewith. The U-shaped elevated end of the build support arm mechanism 169 is large enough to encompass the entire dispersing blade 154 therein when the beginning layers of the 3D printed ceramic object is being shaped. When in the immersed end position, before the first layer of the 3D printed ceramic object is irradiated, the dispersing blade 154 does not contact the build support arm mechanism 169 and the bottom level of the cutting blade 152 cuts the top surface of the composition in the vat 120 without contacting the removable build platform 162.

In some embodiments, the energy source delivery system 170 comprises a delivery system support 179 and an energy source system 175 having an energy source and at least one optical device operatively associated with the energy source and elevatable assembly 160. In some embodiments, the delivery system support 179 is moveably attached to a railing system of the second supporting wall 196 and can be adjusted up-and-down in a z-direction. The energy source delivery system 170 irradiates a layer of the composition over the elevatable assembly 160. The at least one optical device is configured to selectively redirect a light of the energy source to the elevatable assembly 160, wherein a cross-sectional layer of a 3D printed ceramic object is at least partially cured or hardened. The energy source emits at least one of ultraviolet (UV) radiation, infrared (IR) radiation, or visible light.

In some embodiments, the elevatable assembly 160 is substantially level; however, the embodiments are not limited thereto. In some embodiments, the elevatable assembly 160 may be irregular such as convexly or concavely curved, or may have walls or trenches formed therein. In some embodiments, the elevatable assembly 160 may be smooth or textured, as long as the elevatable assembly 160 may move in an upward and downward z-direction via the build motor system for fabrication of 3D printed ceramic objects.

In some embodiments, the material of the vat 120, density control reservoir 140, impeller and shaft of the mixing mechanism 1044, removable build platform 162, build support arm mechanism 169, dispersing blade 154, 1554, and shaft and cutting blade 152, 1552, and shaft of the blade system 150, 1550, two opposing dispersing blade support railings 15571, and two opposing cutting blade support railings 1558h, may be made of a non-stick metal; however, the embodiment is not limited thereto. In some embodiments, the material of the vat 120, density control reservoir 140, impeller and shaft of the mixing mechanism 1044, removable build platform 162, build support arm mechanism 169, dispersing blade 154, 1554, and shaft and cutting blade 152, 1552, and shaft of the blade system 150, 1550, two opposing dispersing blade support railings 15571, and two opposing cutting blade support railings 1558h may also be made of plastic or ceramic, and may be coated or not with a non-stick coating known in the art, depending upon the physical properties of the composition used (e.g., viscosity etc.) and/or fabrication conditions, as long as the devices and systems operate as described and are not hindered by the composition sticking to the devices and systems.

In some embodiments, any adjustable and variable speed motor-like means known to those of skill in the related art may be employed for the blade system motor 155, two opposing dispersing blade motors 15551, two opposing cutting blade motors 1555h, and the build motor system 165, as long as the devices and systems operate as described.

In some embodiments, any pump system and valve means known to those of skill in the related art may be used to control the pumping of the composition, as long as the pump system 135 is able to periodically pump the composition in the vat 120 from the first fluid outlet 122 at the bottom level 121 of the vat 120 and second fluid outlet 124 at the opening level 123 of the vat 120 to the density control reservoir 140 and then back into the vat 120 via the inlet conduit 128.

Numerous different objects can be made by the system and method for three-dimensional (3D) fabrication of liquid photocurable compositions having a filler, including large-scale models or prototypes, small custom 3D printed objects, miniature or microminiature 3D printed objects or devices, etc.

In general, all 3D printing processes start with a computer generated data source or program which describes an object. Next, it is converted into a standard tessellation language Step (STL) file format or other file format. Then, the file is generally read into 3D printing software, which takes the file and separates it into hundreds, thousands, or even millions of 'slices'. The 3D printing software typically outputs machine instructions, which may be in the form of G-code, which is read by a 3D printer system to build each slice. The machine instructions are transferred to the 3D printer system, which then builds the object, layer by layer, based on this slice information in the form of machine instructions.

Figure 18:
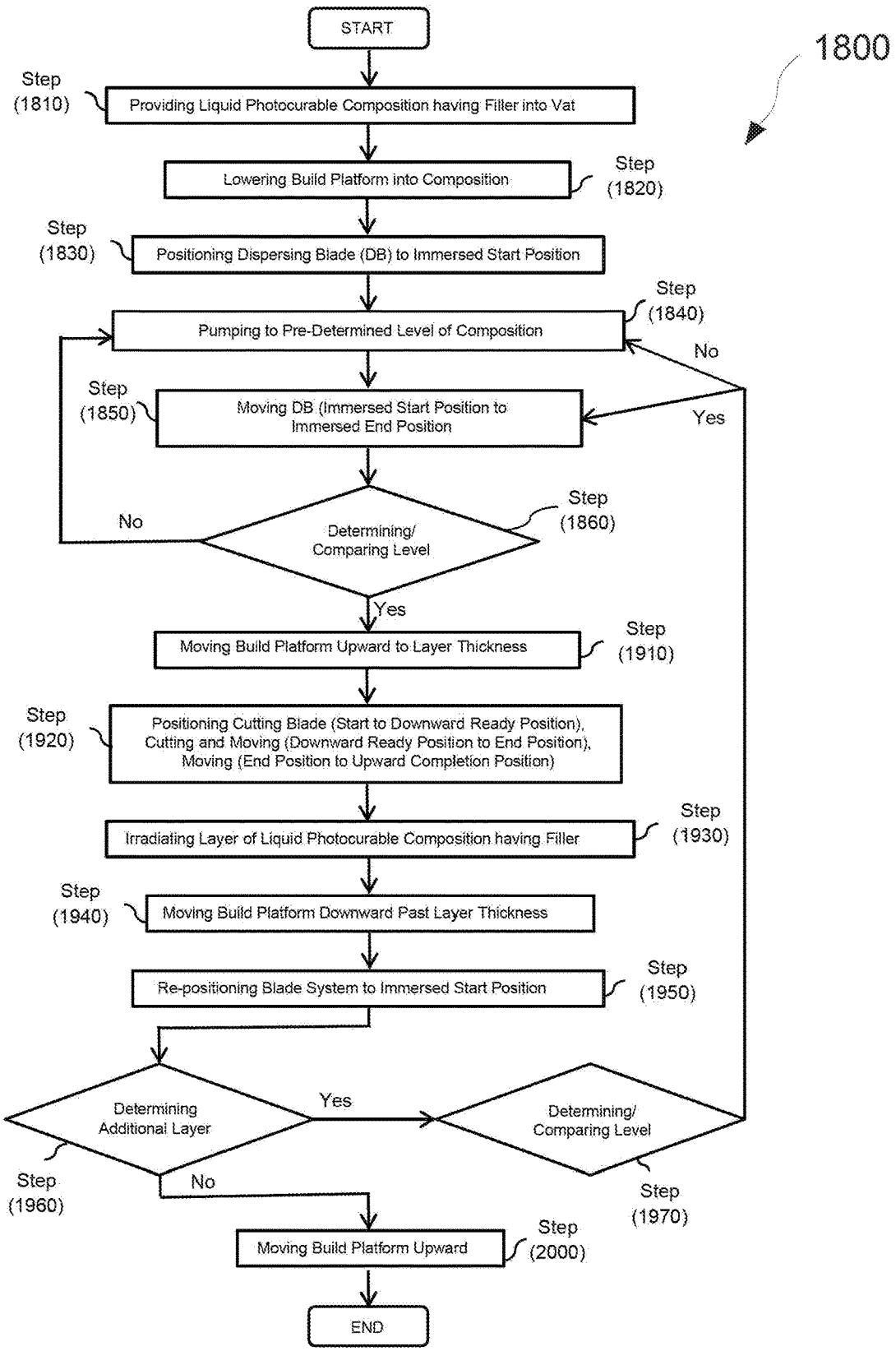
FIG. 18 is a flow chart illustrating a manufacturing method for three-dimensional (3D) fabrication of a composition, according to an example embodiment.

In some embodiments, an AM method configured to fabricate a 3D printed object from a composition, such as ceramic powder is provided. FIG. 18 is a flow chart illustrating a manufacturing method for three-dimensional (3D) fabrication of a composition, according to an example embodiment. The AM method comprises the steps of: Step (1810): providing a composition (or composition from hereforth) into a vat 121 of a vat assembly 110 to a predetermined level, wherein the vat assembly 110 comprises the vat 121, a pump 135, and a density control reservoir 140; Step (1815): performing pre-operational steps, preparing an AM assembly of the AM system for irradiation of layers of the 3D printed object; and Step (1925): performing irradiation of the layers of the 3D printed object via an AM irradiation method of an AM assembly operatively associated with the vat assembly 110.

The vat 120 of the AM method comprises a bottom level 121 having a first fluid outlet 122 and an opening level 123 having a second fluid outlet 124. The outlet conduits of the first and second fluid outlets 122, 124 intersect and extend to the density control reservoir 140, and an inlet conduit 128 extends from the density control reservoir 140 to the opening level of the vat 120. A density of the filler is greater than a density of a liquid of the composition.

The AM assembly of the AM method comprises a blade system 150 and a build system 180 having an elevatable assembly 160 and an energy source delivery system 170. The blade system 150 comprises a dispersing blade 154 and a cutting blade 152, pivoting on near ends thereof, moving back-and-forth in a semi-arc motion and in a z-direction, concurrently, independently or any combination thereof. The dispersing blade 154 has an immersed start position and an immersed end position, opposite the immersed start position. The cutting blade 152 is disposed above the dispersing blade 154 and has a start position, a downward ready position, an end position, opposite the start position, and an upward completion position.

In some embodiments of the AM method, Step (1815) of the AM method comprises the steps of: Step (1820): lowering a build platform 162 of the elevatable assembly 160 into the composition of the vat 120; Step (1830): positioning the dispersing blade 154 to the immersed start position; Step (1840): pumping the composition from a first fluid outlet 122 and second fluid outlet 124 of the vat 120 to the density control reservoir 140 and then back into the vat 120 via an inlet conduit 128 to a predetermined level and temperature range; Step (1850): dispersing the composition via the dispersing blade 154 moving from the immersed start position to the immersed end position, without breaking the surface of the composition and without generating bubbles; and Step (1860): determining and comparing a top surface level of the composition in the vat 120 with a stored predetermined top surface level range, if within the predetermined top surface level range, then yes, performing Step (1910), if no, repeating Step (1840).

In some embodiments of the AM method, the density control reservoir 140 comprises a displacement sensor 185 attached to the vat 120. In some embodiments, the displacement sensor 1185 is a laser displacement sensor, whereby triangulation is applied by combining the displacement sensor 1185 with a position sensitive device (PSD) to perform ranging (detecting the amount of displacement).

In some embodiments of the AM method, the vat assembly 110 of the AM method further comprises at least one perforated outlet extension 625*f* having at least one tube attachment mechanism 626*f* and at least one elongated perforated tube assembly 627*f* communicating therewith. The at least one perforated outlet extension is attached to the first fluid outlet or second fluid outlet 122, 124, or both, if there are more than one perforated outlet extension, via the at least one tube attachment mechanism, expanding the area of composition intake from the first fluid outlet or second fluid outlet 122, 124. The at least one perforated outlet extension 628*p* comprises a plurality of elongated perforated tubes 127*p* in fluid communication with the tube attachment mechanism 626*f*, disposed along at least one bottom level corner section of the vat 120, wherein the at least one bottom level corner section is a section having agglomerated filler.

In some embodiments of the AM method, the bottom of the vat 120 of the vat assembly 110 of the AM method is flat; however, the embodiments are not limited thereto. The bottom of the vat 920 can be funnel-shaped, or any combination thereof and the embodiments are not limited thereto.

In some embodiments of the AM method, the density control reservoir of the vat assembly of the AM method further comprises a heating mechanism 1042, heating the composition from the conduits of the first and second fluid outlets 122, 124 to a predetermined temperature. In some embodiments, temperature detection for controlling the heating mechanism 1042 is achieved via a temperature sensor. In some embodiments of the AM method, the density control reservoir of the vat assembly 110 yet further comprises a mixing mechanism 1044, mixing the composition from the conduits of the first and second fluid outlets 122, 124.

In some embodiments of the AM method, Step (1900) comprises the steps of: Step (1910): moving the elevatable assembly 160 upwards in a z-direction to a layer thickness via a build motor system 165 operatively associated therewith; Step (1920): positioning the cutting blade 152 to the downward ready position and cutting a top surface of the composition in the vat 120 of the vat assembly 110, moving to an end position and positioning the cutting blade 152 to the upward completion position; Step (1930): irradiating a layer of the composition over a build platform 162 via the AM irradiation method comprising an energy source delivery system 170 of the build system 180, the energy source delivery system 170 including an energy source and at least one optical device operatively associated with the elevatable assembly 160, selectively redirecting the energy source to the elevatable assembly 160, wherein a cross-sectional layer of a 3D printed object is at least partially cured, and wherein the energy source emits at least one of ultraviolet (UV) radiation, infrared (IR) radiation, or visible light; Step (1940): moving the elevatable assembly 160 downwards in a z-direction by a distance greater than a layer thickness via a build motor system 165 operatively associated therewith; Step (1950): re-positioning the blade system 150 having the dispersing blade 154 and the cutting blade 152 to the immersed start position, respectively; Step (1960): determining if an additional layer is needed, if yes, performing Step (1970), if no, performing Step (2000); Step (1970): determining and comparing a top surface level of the composition in the vat 120 with a stored predetermined top surface level range, if within the predetermined top surface level range, then yes, repeating Step (1850), if no, repeating Step (1840); and Step (2000): moving the elevatable assembly 160 upwards in a z-direction to above the top surface of the composition via a build motor system 165 operatively associated therewith.

In some embodiments of the AM method, the dispersing blade 154 comprises a plurality of dispersing blades 1253 and a central support 1251, whereby the plurality of dispersing blades 1253 are centrally connected via the central support 1251. The dispersing blade 154 disperses the composition from the inlet conduit 128 extending from the density control reservoir 140 toward and throughout a central top level of the composition, wherein the inlet conduit 128 is disposed near to the immersed start position of the dispersing blade 154.

AM irradiation methods of the AM system of the AM method comprise scan, spin, and selectively photocure (3SP), digital light processing (DLP) and stereolithography (SLA or SL).

Those skilled in the relevant art will readily appreciate that additional steps can be added to the process in order to incorporate additional features into the finished product. Also, the steps can be altered depending upon different requirements.

In some embodiments, a computer-readable medium comprising computer executable instructions which, when executed on a data processing apparatus, causes the data processing apparatus to perform an additive manufacturing (AM) method to fabricate a three-dimensional (3D) object from a composition is provided. The computer-readable medium comprises: Step (1810): providing a composition into a vat 121 of a vat assembly 110 to a predetermined level, wherein the vat assembly 110 comprises the vat 120, a pump 135, and a density control reservoir 140; Step (1820): lowering a build platform 162 of an elevatable assembly 160 a build system 180 of an AM assembly into the composition of the vat 120; Step (1830): positioning a dispersing blade 154 of a blade system 150 to an immersed start position thereof; Step (1840): pumping the composition from a first fluid outlet 122 and second fluid outlet 124 of the vat 120 to the density control reservoir 140 and then back into the vat 120 via an inlet conduit 128 to a predetermined level and temperature range: dispersing the composition via the dispersing blade 154 moving from the immersed start position to an immersed end position thereof, without breaking the surface of the composition and without generating bubbles; Step (1860): determining and comparing a top surface level of the composition in the vat 120 with a stored predetermined top surface level range, if within the predetermined top surface level range, then yes, performing Step (1910), if no, repeating Step (1840); Step (1910): moving the elevatable assembly 160 upwards in a z-direction to a layer thickness via a build motor system 165 operatively associated therewith; Step (1920): positioning a cutting blade 152 of a blade system 150, disposed above the dispersing blade 154, from a start position, to a downward ready position thereof and cutting a top surface of the composition in the vat 120, moving to an end position and positioning the cutting blade 152 to an upward completion position thereof; Step (1930): irradiating a layer of the composition over a build platform 162 via an AM irradiation method comprising an energy source delivery system 170 of the build system 180, the energy source delivery system 170 including an energy source and at least one optical device operatively associated with the elevatable assembly 160, selectively redirecting the energy source to the elevatable assembly 160, wherein a cross-sectional layer of a 3D printed object is at least partially cured, and wherein the energy source emits at least one of ultraviolet (UV) radiation, infrared (IR) radiation, or visible light; Step (1940): moving the elevatable assembly 160 downwards in a z-direction by a distance greater than a layer thickness via a build motor system 165 operatively associated therewith; Step (1950): re-positioning the blade system 150 having the dispersing blade 154 and the cutting blade 152 to the immersed start position, respectively; Step (1960): determining if an additional layer is needed, if yes, performing Step (1970), if no, performing Step (2000); Step (1970): determining and comparing a top surface level of the composition in the vat 120 with a stored predetermined top surface level range, if within the predetermined top surface level range, then yes, repeating Step (1850), if no, repeating Step (1840); and Step (2000): moving the elevatable assembly 160 upwards in a z-direction to above the top surface of the composition via a build motor system 165 operatively associated therewith.

In some embodiments, 3D printing of the subsequent layer occurs before the at least partially cured layer has reached a final cure state. The distinction between partially cured or final cure is whether the partially cured layer may undergo further curing or cross-linking. Functional groups may be present even in the final cure or hardened state, but may remain unreacted due to steric hindrance or other factors. In these embodiments, 3D printing of the layers may be considered wet-on-wet such that the adjacent layers at least physically bond, and may also chemically bond, to one another. For example, it is possible that components in each of the layers chemically cross-link, curing or hardening across the print line, such that the irradiating Step (1930) may affect the curing or hardening of more than just the subsequently 3D printed layer. Thus, a composite including the various layers may be subjected to the curing or hardening condition and any other partially cured or hardened layers may also further, alternatively fully, cure or harden upon a subsequent irradiating step.

In some embodiments, the past layer thickness moving Step (1940) is carried out sequentially in uniform increments. In some embodiments, the past layer thickness moving Step (1940) may be carried out sequentially in non-uniform increments, as an example and not to be limiting, in a range of from substantially 0.05 mm up to 2 mm, or more for each step or increment.

The layer (or first, prior, or previous layer), subsequent layer (or second or latter layer), and any additional layers are collectively referred to as 'the layers' herein. The 'layers,' as used herein in plural form, may relate to the layers at any stage of the inventive method, e.g., in an uncured state, in a partially cured state, in a final cure or hardened state, etc. The term 'layer' in singular form designates the first layer printed with the plurality of closed-packed gas spheres of the liquid photocurable composition.

As with the layer, the subsequent layer formed by printing may have any shape and dimension. For example, the subsequent layer need not be continuous or have a consistent thickness. Further, the subsequent layer may differ from the layer in terms of shape, dimension, size, etc. The subsequent layer may only contact a portion of an exposed surface of the at least partially cured layer. For example, depending on the desired shape of the 3D printed objects, the subsequent layer may be built on the layer selectively.

The layers may each be of various dimensions including thickness and/or width. Thickness and/or width tolerances of the layers may depend on the AM irradiation method used, with certain AM irradiation method processes having high resolutions and others having low resolutions. Thicknesses of the layers may be uniform or may vary, and average thicknesses of the layers may be the same or different. Average thickness is generally associated with thickness of the layer immediately after printing. In some embodiments, the layers independently may have an average thickness in a range of from substantially 0.05 mm up to 2 mm, alternatively, 0.1 mm to 0.5 mm. Thinner and thicker thicknesses are also contemplated. The embodiments are not limited to any particular dimensions of any of the layers.

In some embodiments, inserts, which may have varying shapes and dimensions, and be comprised of any suitable material, may be disposed or placed on or at least partially in any layer during the inventive method. For example, an insert may be employed in between subsequent printing steps, and the insert may become integral with the 3D printed objects upon its formation. Alternatively, the insert may be removed at any step during the inventive method, e.g., to leave a cavity or for other functional or aesthetic functions. The use of such inserts may provide better aesthetics and economics over relying on 3D printing alone.

In some embodiments, as an example, and not to be limiting, the 3D printed object can have a height in a range of from substantially 1 mm up to 500 mm, or more, and/or a maximum width in a range of from substantially 30 mm up to 500 mm, or more. These are examples only: maximum size and width depends on the architecture of the AM system and the resolution of the light source and can be adjusted depending upon the particular goal of the embodiment or object being fabricated.

The details of the construction or composition of the various elements of the AM system of the embodiments not otherwise disclosed are not believed to be critical to the present invention, so long as the recited elements poses the strength or mechanical properties needed for them to perform as disclosed. Additional details of construction are believed to be well within the ability of those of ordinary skill in the art.

In some embodiments, additive manufacturing (AM) systems and methods configured to fabricate a 3D printed object from a composition is provided. Composition in the vat throughout the AM system shaping process is periodically pumped from two different levels in the vat via the first and second fluid outlets to the density control reservoir and then back into the vat via an inlet conduit. The pumping of the vat composition from two different levels ensures that two different composition filler densities are mixed together via confluence when entering the density control reservoir. In addition, the at least one perforated outlet expands the area of pumped composition from the vat and dependent upon the design of the bottom of the vat, an amount of the at least one perforated outlet may be increased, interconnected and positioned to ensure that any area of the vat where agglomeration of composition filler may occur is periodically pumped, thus, mitigating agglomeration in the area.

In some embodiments, a blade system is provided having a dispersing blade and a cutting blade. The dispersing blade disperses the mixed composition from the inlet conduit toward and throughout a central top level of the composition of the vat without breaking a top surface of the composition in the vat and without generating bubbles. In some embodiments, the dispersing blade comprises a plurality of dispersing blades and a central support. The plurality of dispersing blades are centrally connected via the central support and disposed at different angles to facilitate the even spreading of the mixed composition from the inlet conduit toward and throughout the central top level of the composition in one pass-through.

The AM systems and methods of the embodiments do not require manual or automated mixing of the composition in the vat for continuous homogeneous and effective distribution of the fillers in the liquid photocurable composition throughout the AM system shaping process. The mixed composition has a filler density that is similar to the filler density of the original vat composition before the start of the AM system shaping process. The difference in mechanical properties of each layer of the shaped 3D printed object of the embodiments is decreased and quality and 3D printing consistency is assured. Additionally, the plurality of different angled blades of the dispersing blade evenly spreads the mixed composition from the inlet conduit toward and throughout the central top level of the composition in one pass-through, efficiently spreading and distributing the mixed composition within the vat without generating bubbles.

In some embodiments, additionally, the each layer thickness of the 3D printed object is controlled via fluid level detection employing a sensor and the outlet conduits, pump, density control reservoir, and inlet conduit. Manual or automated leveling of the composition in the vat for homogeneous thicknesses during the AM system shaping process is eliminated.

In some embodiments, even further, the temperature of each cured layer of the composition is controlled via temperature detection employing a sensor and the outlet conduits, pump, density control reservoir, and inlet conduit. A predetermined temperature of the operating level of the composition for curing consistency is maintained.

It is to be understood that the appended claims are not limited to express the particular elements, devices, or apparatuses described in the detailed description, which can vary between particular embodiments which fall within the scope of the appended claims. With respect to any Markush groups relied upon herein for describing particular features or aspects of various embodiments, different, special, and/or unexpected results can be obtained from each member of the respective Markush group independent from all other Markush members. Each member of a Markush group can be relied upon individually and or in combination and provides adequate support for specific embodiments within the scope of the appended claims.

Further, any ranges and subranges relied upon in describing various embodiments of the present disclosure independently and collectively fall within the scope of the appended claims, and are understood to describe and contemplate all ranges including whole and/or fractional values therein, even if such values are not expressly written herein. Those skilled in the relevant art readily recognizes that the enumerated ranges and subranges sufficiently describe and enable various embodiments of the present disclosure, and such ranges and subranges can be further delineated into relevant halves, thirds, quarters, fifths, and so on. As just one example, a range "of from 0.1 to 0.9" can be further delineated into a lower third, i.e., from 0.1 to 0.3, a third, i.e., from 0.4 to 0.6, and an upper third, i.e., from 0.7 to 0.9, which individually and collectively are within the scope of the appended claims, and can be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 7" inherently includes a subrange of from at least 7 to 35, a subrange of from at least 7 to 25, a subrange of from 25 to 35, and so on, and each subrange can be relied upon individually and/or collectively and provides adequate support for specific embodiments within the scope of the appended claims. Finally, an individual number within a disclosed range can be relied upon and provides adequate support for specific embodiments within the scope of the appended claims. As an example, a range "of from 1 to 9" includes various individual integers, such as 3, as well as individual numbers including a decimal point (or fraction), such as 4.1, which can be relied upon and provide adequate support for specific embodiments within the scope of the appended claims.

The present application has been described herein in an illustrative manner, and it is to be understood that the terminology which has been used is intended to be in the nature of words of description rather than of limitation. Many modifications and variations of the present embodiments are possible in light of the above teachings. The present application can be practiced otherwise than as specifically described within the scope of the appended claims. The subject matter of all combinations of independent and dependent claims, both single and multiple dependent, is herein expressly contemplated.

What is claimed is:
1. An additive manufacturing (AM) system configured to fabricate a three-dimensional (3D) object from a composition, comprising:
   a vat assembly comprising:
      a vat, holding liquid photocurable composition therein, comprising a bottom level having a first fluid outlet and an opening level having a second fluid outlet;
      a pump system;
      a density control reservoir; and
      at least one perforated outlet extension having at least one tube attachment mechanism and at least one elongated perforated tube assembly communicating therewith; and an AM assembly operatively associated with the vat assembly, performing an AM irradiation method thereto, wherein the pump system pumps the composition from the vat to the density control reservoir and then back into the vat, and outlet conduits of the first and second fluid outlets intersect and extend to the density control reservoir, respectively, and an inlet conduit extends from the density control reservoir to the opening level of the vat, and wherein the at least one perforated outlet extension is attached to the first fluid outlet or second fluid outlet, or both, if there are more than one perforated outlet extension, via the at least one tube attachment mechanism, expanding the area of fluid intake.

2. The AM system of claim 1, wherein the elongated perforated tube assembly comprises a plurality of elongated perforated tubes in communication with the tube attachment mechanism.

3. The AM system of claim 2, wherein the plurality of elongated perforated tubes is disposed along at least one bottom level corner section of the vat, wherein the at least one bottom level corner section is a section having agglomerated filler.

4. The AM system of claim 1, wherein a bottom of the vat of the vat assembly is flat, funnel-shaped, or any combination thereof.

5. The AM system of claim 1, wherein the density control reservoir of the vat assembly comprises:
a heating mechanism, heating the composition from the conduits of the first and second fluid outlets to a predetermined temperature.

6. The AM system of claim 1, wherein the density control reservoir of the vat assembly comprises:
a mixing mechanism, mixing the composition from the conduits of the first and second fluid outlets.

7. The AM system of claim 1, wherein the AM assembly comprises:
a blade system operatively associated with the vat assembly and AM assembly, dispersing and cutting a top level and top surface, respectively, of the composition in the vat of the vat assembly;
a build system operatively associated with the blade system and vat assembly, fabricating a three-dimensional (3D) object made of the composition therein via the AM irradiation method of the AM system, comprising:

an elevatable assembly operatively associated with the vat of the vat assembly, moving in an upward and downward z-direction via a build motor system operatively associated therewith; and
an energy source delivery system including an energy source, and at least one optical device operatively associated with the energy source and elevatable assembly, irradiating a layer of the composition over a build platform, wherein the at least one optical device is configured to selectively redirect a light of the energy source to the elevatable assembly, and wherein a cross-sectional layer of a 3D printed object is at least partially cured, wherein the energy source emits at least one of ultraviolet (UV) radiation, infrared (IR) radiation, or visible light.

8. The AM system of claim 7, wherein the blade system comprises:
a dispersing blade having an immersed start position and an immersed end position, opposite the immersed start position, dispersing the top level of the composition in the vat of the vat assembly without breaking a top surface of the composition and without generating bubbles; and
a cutting blade disposed above the dispersing blade having a start position, a downward ready position, an end position, opposite the start position, and an upward completion position, cutting the top surface of the composition in the vat of the vat assembly,
wherein the dispersing blade and cutting blade both pivot on near ends thereof, moving back-and-forth in a semi-arc motion and in a z-direction, concurrently, independently or any combination thereof.

9. The AM system of claim 8, wherein the dispersing blade comprises a plurality of dispersing blades and a central support, whereby the plurality of dispersing blades are centrally connected via the central support, and wherein the dispersing blade disperses the composition from the inlet conduit extending from the density control reservoir toward and throughout a central top level of the composition, wherein the inlet conduit is disposed near to the immersed start position of the dispersing blade.

10. The AM system of claim 1, wherein the AM irradiation method of the AM system comprises scan, spin, and selectively photocure (3SP), digital light processing (DLP) and stereolithography (SLA or SL).

11. The AM system of claim 1, wherein a density of a filler is greater than a density of a liquid of the liquid photocurable composition.

* * * * *